United States Patent
Okamoto et al.

(10) Patent No.: US 10,082,435 B2
(45) Date of Patent: Sep. 25, 2018

(54) PRESSURE SENSOR

(71) Applicant: KABUSHIKI KAISHA TOSHIBA, Tokyo (JP)

(72) Inventors: Kazuaki Okamoto, Tokyo (JP); Akio Hori, Kanagawa (JP); Hideaki Fukuzawa, Kanagawa (JP); Yoshihiko Fuji, Kanagawa (JP); Akiko Yuzawa, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 14/742,453

(22) Filed: Jun. 17, 2015

(65) Prior Publication Data
US 2016/0003697 A1  Jan. 7, 2016

(30) Foreign Application Priority Data

Jul. 2, 2014  (JP) ................................. 2014-136503

(51) Int. Cl.
  *G01L 9/00*  (2006.01)
  *G01L 9/16*  (2006.01)
(52) U.S. Cl.
  CPC ............ *G01L 9/0041* (2013.01); *G01L 9/008* (2013.01); *G01L 9/0047* (2013.01); *G01L 9/16* (2013.01)
(58) Field of Classification Search
  CPC ............................. G01L 9/0052; G01L 9/0047
  See application file for complete search history.

(56) References Cited

U.S. PATENT DOCUMENTS

| | | | | |
|---|---|---|---|---|
| 4,579,001 A | * | 4/1986 | Hosterman | F16K 17/1626 137/68.18 |
| 4,600,912 A | * | 7/1986 | Marks | H01L 29/84 257/E29.324 |
| 4,904,978 A | * | 2/1990 | Barth | G01L 9/0055 338/4 |
| 5,049,460 A | * | 9/1991 | Benecke | H01J 37/09 250/492.2 |
| 5,107,309 A | * | 4/1992 | Johnson | H01L 29/66166 257/491 |

(Continued)

FOREIGN PATENT DOCUMENTS

| | | |
|---|---|---|
| JP | 3-291975 | 12/1991 |
| JP | 4-148569 | 5/1992 |

(Continued)

*Primary Examiner* — Harshad R Patel
*Assistant Examiner* — Tran M Tran
(74) *Attorney, Agent, or Firm* — Finnegan, Henderson, Farabow, Garrett & Dunner, L.L.P.

(57) ABSTRACT

A pressure sensor according to an embodiment includes: a support member; a membrane supported by the support and having flexibility; and a strain detection element formed on the membrane. The strain detection element includes a first magnetic layer formed on the membrane and having a magnetization, a second magnetic layer having a magnetization, and an intermediate layer formed between the first magnetic layer and the second magnetic layer. A direction of at least one of the magnetization of the first magnetic layer and the magnetization of the second magnetic layer changes relatively to that of the other depending on a strain of the membrane. Moreover, the membrane includes an oxide layer that includes aluminum.

19 Claims, 15 Drawing Sheets

(56) References Cited

U.S. PATENT DOCUMENTS

| | | | |
|---|---|---|---|
| 5,165,282 A | 11/1992 | Nakamufa et al. | |
| 5,245,504 A * | 9/1993 | Bullis | G01L 9/0042 29/25.42 |
| 5,344,523 A * | 9/1994 | Fung | G01L 9/0073 438/53 |
| 5,672,551 A * | 9/1997 | Fung | G01L 9/0055 148/DIG. 136 |
| 5,714,722 A * | 2/1998 | Noponen | H04R 1/24 181/166 |
| 5,949,118 A * | 9/1999 | Sakai | G01L 9/0042 257/419 |
| 6,184,561 B1 * | 2/2001 | Tanaka | G01L 9/0054 257/417 |
| 6,293,149 B1 * | 9/2001 | Yoshida | G01P 15/0802 438/52 |
| 6,311,563 B1 | 11/2001 | Ishikura | |
| 6,599,757 B1 * | 7/2003 | Murai | B41J 2/14233 438/240 |
| 6,757,404 B2 * | 6/2004 | Takewa | H04R 7/12 181/174 |
| 6,796,193 B2 * | 9/2004 | Haji-Sheikh | G01L 9/0055 438/50 |
| 7,024,937 B2 * | 4/2006 | James | G01L 19/003 73/756 |
| 7,535,217 B2 * | 5/2009 | Quandt | G01L 9/16 324/207.2 |
| 7,540,198 B2 * | 6/2009 | Ichikawa | G01L 9/0054 73/721 |
| 7,583,081 B2 * | 9/2009 | Schmitt | G01L 9/007 324/209 |
| 7,640,798 B2 * | 1/2010 | Oda | G01F 1/6845 73/204.26 |
| 7,661,318 B2 * | 2/2010 | Brosh | G01L 19/146 73/715 |
| 7,743,666 B2 * | 6/2010 | Kuwashima | G01L 1/005 73/779 |
| 7,775,119 B1 * | 8/2010 | Suminto | G01L 9/0042 73/727 |
| 7,786,541 B2 * | 8/2010 | Izuo | G01L 9/0047 257/415 |
| 7,802,481 B2 * | 9/2010 | Henn | G01L 9/0055 250/231.19 |
| 8,188,556 B2 * | 5/2012 | Adachi | G01L 9/0042 257/415 |
| 8,413,518 B2 * | 4/2013 | Kummer | G01L 23/08 361/283.4 |
| 8,567,255 B2 * | 10/2013 | Aoki | G01L 9/0054 73/715 |
| 8,760,154 B2 * | 6/2014 | Giddings | G01B 7/24 324/209 |
| 8,933,909 B2 | 1/2015 | Giddings et al. | |
| 8,958,574 B2 * | 2/2015 | Fukuzawa | G01L 9/0042 381/115 |
| 8,973,446 B2 * | 3/2015 | Fukuzawa | G01L 1/12 73/779 |
| 9,032,808 B2 * | 5/2015 | Giddings | G01R 33/091 73/779 |
| 9,046,549 B2 * | 6/2015 | Higashi | G01R 3/00 |
| 9,136,855 B2 | 9/2015 | Itakura et al. | |
| 9,168,025 B2 * | 10/2015 | Nakamura | A61B 8/4444 |
| 9,176,014 B2 * | 11/2015 | Fuji | G01L 9/0044 |
| 9,250,142 B2 * | 2/2016 | Fukuzawa | B81B 3/0086 |
| 9,435,868 B2 * | 9/2016 | Giddings | G01R 33/091 |
| 9,609,437 B2 * | 3/2017 | Rousseau | H04R 7/122 |
| 2008/0094059 A1 | 4/2008 | Sasaki et al. | |
| 2011/0295128 A1 | 12/2011 | Yuasa et al. | |
| 2012/0079887 A1 | 4/2012 | Giddings et al. | |
| 2012/0245477 A1 | 9/2012 | Giddings et al. | |
| 2013/0079648 A1 | 3/2013 | Fukuzawa et al. | |
| 2013/0255069 A1 | 10/2013 | Higashi et al. | |
| 2014/0069200 A1 | 3/2014 | Yuasa et al. | |
| 2014/0090486 A1 | 4/2014 | Fuji et al. | |
| 2014/0137658 A1 | 5/2014 | Higashi et al. | |
| 2014/0137668 A1 | 5/2014 | Fukuzawa et al. | |
| 2014/0369530 A1 | 12/2014 | Fuji et al. | |
| 2015/0069540 A1 | 3/2015 | Asano et al. | |
| 2015/0079398 A1 * | 3/2015 | Amin | C01B 21/068 428/408 |
| 2015/0082886 A1 | 3/2015 | Fukuzawa et al. | |
| 2015/0082888 A1 | 3/2015 | Otsu et al. | |
| 2015/0082894 A1 | 3/2015 | Okamoto et al. | |
| 2015/0082899 A1 | 3/2015 | Kaji et al. | |
| 2015/0082900 A1 | 3/2015 | Fuji et al. | |
| 2015/0082901 A1 | 3/2015 | Fuji et al. | |
| 2015/0082917 A1 | 3/2015 | Fuji et al. | |
| 2015/0082919 A1 | 3/2015 | Higashi et al. | |
| 2015/0088008 A1 | 3/2015 | Fuji et al. | |
| 2015/0130538 A1 | 5/2015 | Itakura et al. | |
| 2015/0130647 A1 | 5/2015 | Itakura et al. | |
| 2015/0137858 A1 | 5/2015 | Itakura et al. | |
| 2015/0204739 A1 | 7/2015 | Fukuzawa et al. | |

FOREIGN PATENT DOCUMENTS

| | | |
|---|---|---|
| JP | 2000-105164 | 4/2000 |
| JP | 2002-22584 | 1/2002 |
| JP | 2008-107323 | 5/2008 |
| JP | 2011-244938 | 12/2011 |
| JP | 2012-78186 | 4/2012 |
| JP | 5101659 | 12/2012 |
| JP | 2013-70732 | 4/2013 |
| JP | 2013-73374 | 4/2013 |
| JP | 5235964 | 7/2013 |
| JP | 2013-165977 | 8/2013 |
| JP | 2013-205403 | 10/2013 |
| JP | 5367877 | 12/2013 |
| JP | 2014-52360 | 3/2014 |
| JP | 5443421 | 3/2014 |
| JP | 2014-74606 | 4/2014 |
| JP | 2014-102171 | 6/2014 |
| JP | 2014-103539 | 6/2014 |
| JP | 5579218 | 7/2014 |
| JP | 5607204 | 10/2014 |
| JP | 2014-240824 | 12/2014 |
| JP | 5677258 | 2/2015 |
| JP | 2015-52571 | 3/2015 |
| JP | 2015-59925 | 3/2015 |
| JP | 2015-59927 | 3/2015 |
| JP | 2015-59930 | 3/2015 |
| JP | 2015-59932 | 3/2015 |
| JP | 2015-61057 | 3/2015 |
| JP | 2015-61059 | 3/2015 |
| JP | 2015-61070 | 3/2015 |
| JP | 2015-61310 | 3/2015 |
| JP | 2015-64255 | 4/2015 |
| JP | 5701807 | 4/2015 |
| JP | 2015-95830 | 5/2015 |
| JP | 2015-95865 | 5/2015 |
| JP | 2015-100036 | 5/2015 |
| JP | 2015-119473 | 6/2015 |
| JP | 2015-137869 | 7/2015 |

\* cited by examiner

Tensile State STt

Unstrained State STo

Compressive State STc

FIG. 14
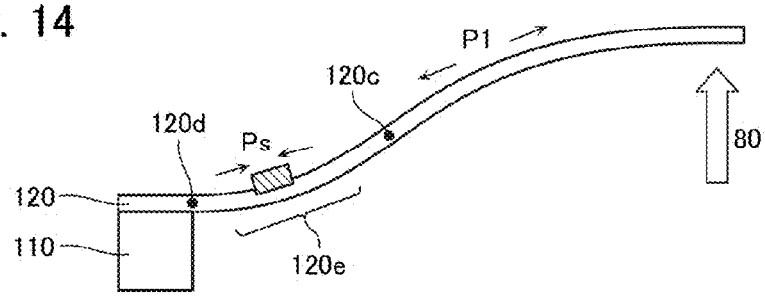
FIG. 15A
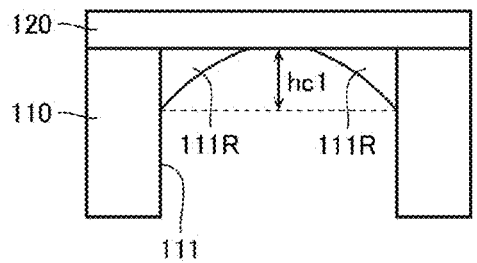
FIG. 15B
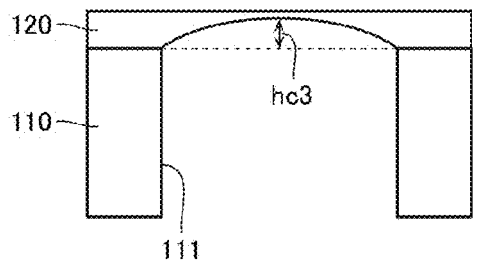
FIG. 16A
| Selection Ratio | |
|---|---|
| Si | 1 |
| SiO$_2$ | 140 |
| AlOx (Sputtering-Deposited) | 1050 |
FIG. 16B
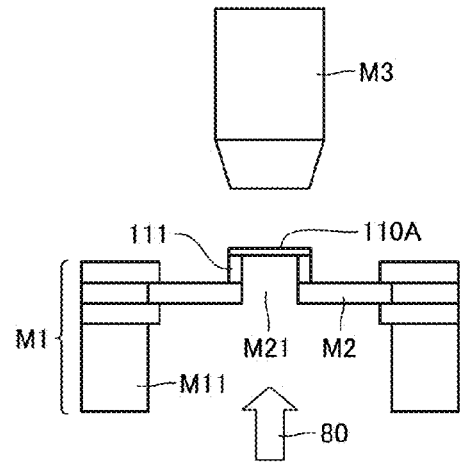

PRESSURE SENSOR

CROSS REFERENCE TO RELATED APPLICATIONS

This application is based on and claims the benefit of priority from prior Japanese Patent Application No. 2014-136503, filed on Jul. 2, 2014, the entire contents of which are incorporated herein by reference.

FIELD

Embodiments described in the present specification relate to a pressure sensor.

BACKGROUND

In recent years, a pressure sensor employing spin technology has been proposed. The pressure sensor employing spin technology is a device that measures a pressure using a principle that magnetization directions in a plurality of magnetic layers change relatively due to a pressure changing, whereby a value of electrical resistance of an element changes. Such a pressure sensor has a strain detection element employing spin technology disposed on a membrane formed on a support member; and converts a strain of the membrane caused by the pressure into a resistance change of the strain detection element, thereby detecting the pressure applied to the membrane.

A structure in which such a pressure sensor has a plurality of strain detection elements employing spin technology disposed on one membrane that bends by the pressure, has been proposed. The pressure sensor including these plurality of strain detection elements desirably shows a response in which there is no occurrence of unintended variation in characteristics among the strain detection elements.

In order to achieve an improvement in performance of such a pressure sensor, characteristics of the membrane including a film thickness of the membrane are preferably uniform. However, in a pressure sensor employing a conventional material of the membrane, it has been difficult to render characteristics of the membrane uniform, hence it has not been easy to improve performance of the pressure sensor.

BRIEF DESCRIPTION OF THE DRAWINGS

FIG. 14 is a conceptual diagram explaining a way of deformation of the membrane 120.

FIG. 15A and FIG. 15B show a manufacturing step when etching a substrate 110 to form the hollow portion 111.

FIG. 16A is a table showing etch selectivity with respect to silicon.

FIG. 16B is a schematic view for explaining a device for evaluating sensitivity to applied pressure of a vibrating portion 121 of the membrane 120, and an evaluation method thereby.

DETAILED DESCRIPTION

Figure 1:
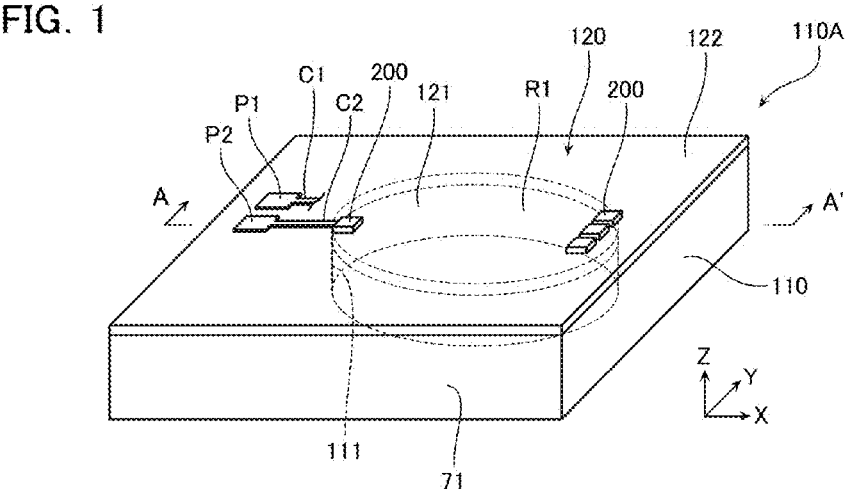
FIG. 1 is a schematic perspective view showing a configuration of a pressure sensor according to a first embodiment.

A pressure sensor according to an embodiment described below includes: a support member; a membrane supported by the support and having flexibility; and a strain detection element formed on the membrane. The strain detection element includes a first magnetic layer formed on the membrane and having a magnetization, a second magnetic layer having a magnetization, and an intermediate layer formed between the first magnetic layer and the second magnetic layer. A direction of at least one of the magnetization of the first magnetic layer and the magnetization of the second magnetic layer changes relatively to that of the other depending on a strain of the membrane. Moreover, the membrane includes an oxide layer that includes aluminum.

Pressure sensors according to embodiments will be described below with reference to the drawings. Note that the drawings are schematic or conceptual, and that a relationship of film thickness and width of each of the portions, a ratio of size between portions, and so on, are not necessarily identical to those in reality. Moreover, even when expressing the same portions, those portions are also sometimes expressed with mutually different dimensions or ratios depending on the drawing. Note that in the specification and each of the drawings of the present application, an element similar to that previously mentioned regarding an already-described drawing will be assigned with a reference symbol identical to that previously assigned, and a detailed description of that element will be appropriately omitted.

First Embodiment

First, a pressure sensor according to a first embodiment will be described with reference to FIG. 1, and so on.

FIG. 1 is a schematic perspective view exemplifying a pressure sensor 110A and a strain detection element 200 according to the first embodiment. Note that in order to make FIG. 1 more easily seen, FIG. 1 displays only part of the strain detection element 200, moreover omits illustration of an insulating portion, and mainly depicts a conductive portion.

Figure 2:
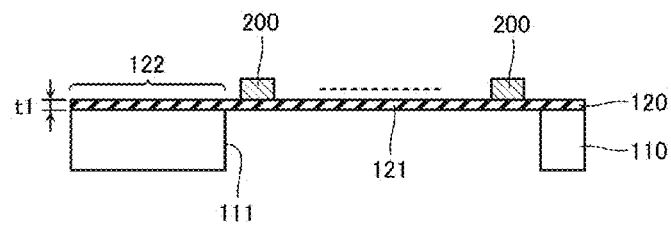
FIG. 2 is a schematic cross-sectional view showing a configuration of the same pressure sensor.
Figure 3A:
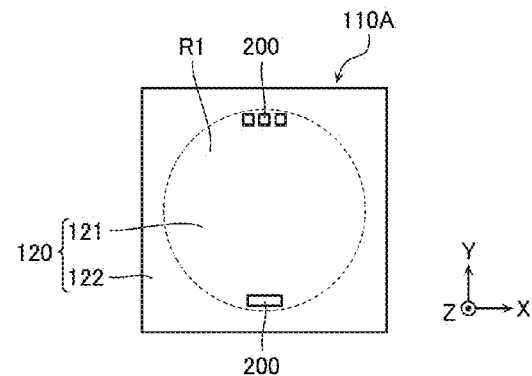
FIG. 3A is a schematic plan view showing a configuration of the same pressure sensor.
Figure 3B:
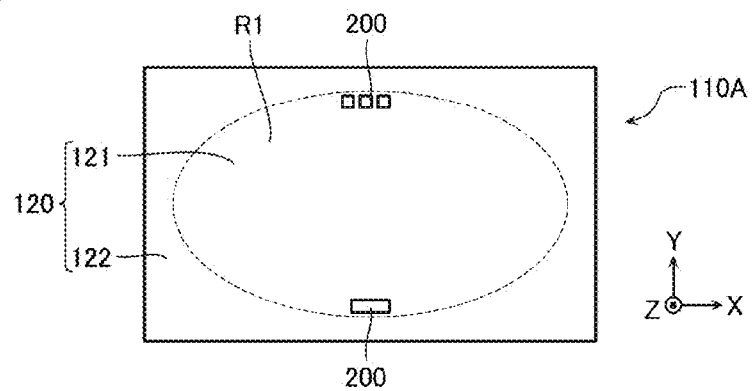
FIG. 3B is a schematic plan view showing a configuration of the same pressure sensor.
Figure 3C:
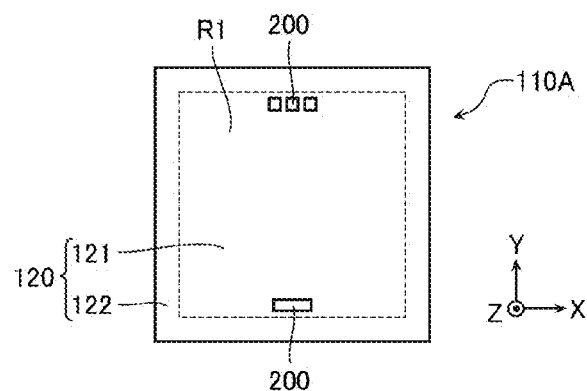
FIG. 3C is a schematic plan view showing a configuration of the same pressure sensor.
Figure 3D:
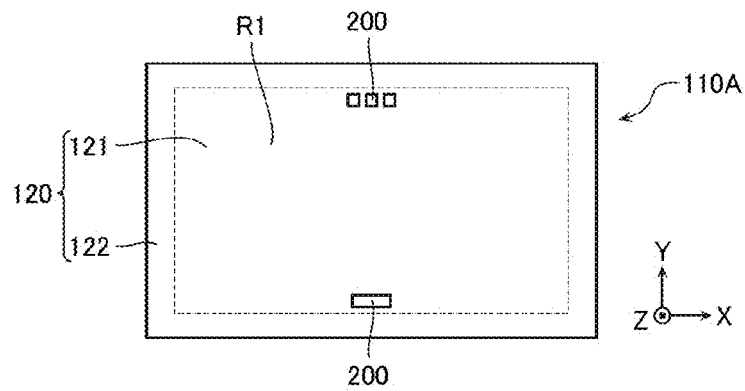
FIG. 3D is a schematic plan view showing a configuration of the same pressure sensor.

Moreover, FIG. 2 is a schematic cross-sectional view looking from A-A' of FIG. 1. In addition, FIG. 3 includes schematic plan views showing configurations of the pressure sensor 110A. Furthermore, FIG. 4 is a schematic perspective view showing a configuration of the strain detection element 200, and FIG. 5 is a schematic perspective view for explaining operation of the pressure sensor 110A.

As shown in FIG. 2, the pressure sensor 110A includes: a membrane 120; and the strain detection element 200 formed on the membrane 120. The membrane 120 has flexibility whereby it bends in response to a pressure from external. The strain detection element 200 strains in response to bending of the membrane 120, and changes its electrical resistance value according to this strain. Therefore, by detecting a change in the electrical resistance value of the strain detection element 200, the pressure from external is detected. Note that the pressure sensor 110A may detect a sound wave or an ultrasonic wave. In this case, the pressure sensor 110A functions as a microphone or an ultrasonic sensor.

As shown in FIG. 1, the pressure sensor 110A includes: a substrate 110; the membrane 120 provided to one surface of the substrate 110; and the strain detection element 200 provided on the membrane 120. Moreover, provided on the membrane 120 are a wiring line C1, a pad P1, a wiring line C2, and a pad P2 that are connected to the strain detection element 200. Hereafter, a direction perpendicular to the substrate 110 is assumed to be a Z direction. Moreover, a certain direction perpendicular to this Z direction is assumed to be an X direction, and a direction perpendicular to the Z direction and the X direction is assumed to be a Y direction.

As shown in FIG. 2, the substrate 110 is a plate-like substrate including a hollow portion 111, and functions as a support member; supporting the membrane 120 such that the membrane 120 bends in response to an external pressure. In the present embodiment, the hollow portion 111 is a hole having, for example, a cylindrical shape (it may have another shape, as will be mentioned later) that penetrates the substrate 110. The substrate 110 is configured from, for example, a semiconductor material such as silicon, a conductive material such as a metal, or an insulating material. Moreover, the substrate 110 may include the likes of silicon oxide (SiOx) or silicon nitride (SiNx), for example. On the other hand, the membrane 120 is formed by an oxide that includes aluminum, for example, aluminum oxide.

The hollow portion 111 is formed by carrying out etching on the substrate 110 to process the substrate 110 until the membrane 120 is exposed.

The inside of the hollow portion 111 is designed to allow the membrane 120 to be bent in, for example, a direction (Z axis direction) perpendicular to a principal plane of the substrate 110. For example, the inside of the hollow portion 111 may be in a decompressed state or a vacuum state. Moreover, the inside of the hollow portion 111 may be filled with a gas such as air or an inert gas, or a liquid. Furthermore, the hollow portion 111 may be in communication with external.

As shown in FIG. 2, the membrane 120 is formed thinly compared to the substrate 110. Moreover, the membrane 120 includes: a vibrating portion 121 that is positioned directly above the hollow portion 111 and that bends in response to an external pressure; and a supported portion 122 that is formed integrally with the vibrating portion 121 and that is supported by the substrate 110. As shown in, for example, FIG. 3A, the supported portion 122 surrounds the vibrating portion 121. Hereafter, a region positioned directly above the hollow portion 111 of the membrane 120 will, be called a first region R1. The vibrating portion 121 and the supported portion 122 are both formed by an oxide that includes aluminum (Al) (as an example, aluminum oxide). Note that an overall thickness t1 of the membrane 120 can be set to, for example, not less than 50 nanometers (nm) and not more than 3 micrometers (μm). In this case, it can preferably be set to not less than 100 nm and not more than 2 μm.

The first region R1 may be formed in a variety of forms. For example, the first region R may be formed in a substantially true circular shape as shown in FIG. 3A, may be formed in an elliptical shape (for example, a flattened circular shape) as shown in FIG. 3B, may be formed in a substantially square shape as shown in FIG. 3C, or may be formed in a rectangular shape as shown in FIG. 3D. Moreover, the first region R1 may also be formed as a polygon or regular polygon. In addition, the first region R1 may be a combination of the above-described shapes. Note that in the case where the first region R1 is the likes of a rectangle, a square, and a polygon, its corner portions may be formed sharply, or its corner portions may be provided with a roundness.

As shown also in the embodiments below, in the case of a strain detection element employing spin technology, the shape of the membrane 120 is more preferably a shape where X-Y anisotropy of strain generated in the membrane increases when a pressure is applied to the membrane. For example, it is preferably a shape close to a rectangular shape. This makes it possible to dispose a large number of strain detection elements employing spin technology. It also improves signal-to-noise ratio (SNR) according to the number of elements N. When individual strain detection elements are assumed to show identical outputs, an improvement effect of SNF when a plurality of N elements are employed is 20 log√N. That is, SNR improves as the number N increases. This is due to the fact that when the strain detection elements are each connected in series, whereas a signal increases N times proportionally to the number of elements N, while noise increases proportionally to √N according to the number of elements N, hence SNF effectively improves by 20 log(N/√N)=20 log√N.

Note that when a planar shape of the first region R1 is a perfectly circular shape, a diameter of the first region R1 can be set to, for example, not less than 1 μm and not more than 1000 μm. In this case, it can preferably be set to not less than 60 μm and not more than 600 μm.

When the planar shape of the first region R1 is a square, a length of one side of the first region R1 can be set to, for example, not less than 1 μm and not more than 650 μm. In this case, it can preferably be set to not less than 50 μm and not more than 550 μm. When the planar shape of the first region R1 is a rectangle, a length of a short side of the first region R1 can be set to, for example, not less than 1 μm and not more than 500 μm. In this case, it can preferably be set to not less than 50 μm and not more than 400 μm.

Figure 3E:
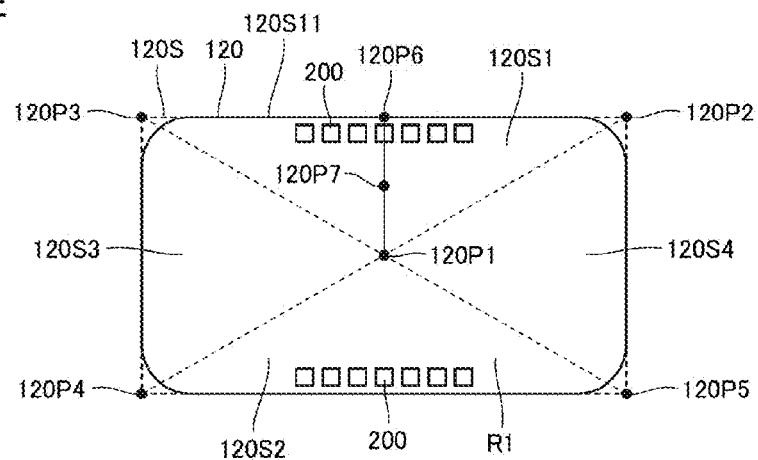
FIG. 3E is a schematic plan view showing a placement position on a membrane 120 of a strain detection element 200.
Figure 4:
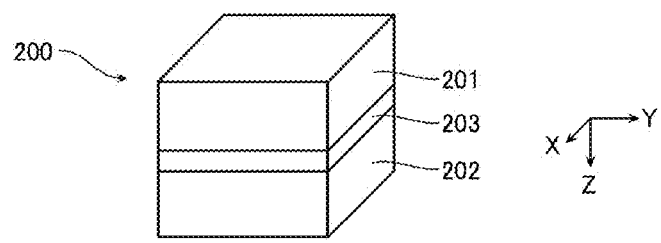
FIG. 4 is a schematic perspective view showing a configuration of a strain detection element according to the first embodiment.

FIG. 3E is a schematic plan view showing a placement position on the membrane 120 of the strain detection element 200. As an example, a rectangle whose corner portions are provided with a roundness is adopted as the shape of the first region R1. In this way, the corner portions of the shape of the first region R1 are provided with a roundness. The rounding of the corner portions is provided for the following reason. That is, when the membrane undergoes an etching process by RIE (Reactive Ion Etching) or the like, the central portion and the corner portions have different etching rates. Rounding the corner portions may suppress a negative influence due to a film thickness distribution of the membrane 120.

A roundness of R of the corner portions in this case depends also on area of the membrane 120, but a desirable design is to set R=30 to 100 μm. It is suitable to set R=about 70 μm in order to perform etching processing uniformly, while maintaining X-Y anisotropic strain large.

It is suitable for the strain detection element 200 to be disposed at an edge of the first region R1. As shown in FIG. 3E, "an edge of the first region R1" herein indicates a position between a point 120P6 on a boundary of the supported portion 122 and the vibrating portion 121, and a central point 120P7 of a line segment joining a centroid 120P1 of the first region R1 and the point 120P6. This is because at an edge of the first region R1, a strain of the vibrating portion 121 is easily generated, and detection sensitivity of the strain rises. In addition, this is because the strain detection element 200 detects strain by rotation of magnetization in a magnetic layer, hence it is easier for directionality of that strain to be discriminated when the strain detection element 200 is positioned at an edge of the first region R1. However, in the case where dimensions are different for an up-down direction and a left-right direction as in FIG. 3B (ellipse) and FIG. 3D (rectangle), the strain detection element 200 may be disposed close to the center of the first region R1, instead of being disposed at an edge of the first region R1.

Moreover, as shown in FIG. 3E, when the first region R1 of the membrane 120 is projected on a plane (for example, the X-Y plane) parallel to the first region R1, a minimum circumscribed rectangle 120S of the first region R1 can be formed in a region surrounded by points 120P2, 120P3, 120P4, and 120P5. The minimum circumscribed rectangle 120S includes: a region 120S1 formed by joining the point 120P2, the point 12023, and the centroid 120P1 by line segments; a region 120S2 formed by joining the point 120P4, the point 120P5, and the centroid 120P1 by line segments; a region 120S3 formed by joining the point 120P3, the point 120P4, and the centroid 120P1 by line segments; and a region 120S4 formed by joining the point 120P2, the point 120P5, and the centroid 120P1 by line segments.

Moreover, as shown in FIG. 3E, a region where the first region R1 and the region 120S1 overlap, of the membrane 120 has a plurality of the strain detection elements 200 disposed thereon. In addition, at least two of the plurality of strain detection elements 200 disposed on the region where the first region P1 and the region 120S1 overlap are different from each other in a direction parallel to a line segment 120S11 joining the point 120P2 and the point 120P3.

Next, a schematic configuration of the strain detection element 200 according to the present embodiment will be described with reference to FIG. 4. FIG. 4 is a schematic perspective view showing the configuration of the strain detection element 200 according to the first embodiment. As shown in FIG. 4, the strain detection element 200 according to the present embodiment includes a first magnetic layer 201, a second magnetic layer 202, and an intermediate layer 203 provided between the first magnetic layer 201 and the second magnetic layer 202. The first magnetic layer 201 and the second magnetic layer 202 both have a magnetization, and are disposed separated from each other via the intermediate layer 203.

When a strain occurs in the strain detection element 200, a direction of magnetization of at least one of the magnetic layers 201 and 202 changes relatively to the magnetization of the other. Accompanying this, an electrical resistance value between the magnetic layers 201 and 202 changes. Therefore, by detecting this change in the electrical resistance value, the strain that has occurred in the strain detection element 200 can be detected.

In the present embodiment, the first magnetic layer 201 is configured from a ferromagnetic body and functions as, for example, a magnetization free layer. Moreover, the second magnetic layer 202 is also configured from a ferromagnetic body and functions as, for example, a reference layer. The second magnetic layer 202 may be a magnetization fixed layer or may be a magnetization free layer. That is, it is only required that a change in magnetization of the first magnetic layer 201 be made more easily than a change in magnetization of the second magnetic layer 202.

Note that it is also possible for the first magnetic layer 201 to be formed larger in the XY plane than the second magnetic layer 202, for example. Moreover, it is also possible for one of the first magnetic layer 201 and the second magnetic layer 202 to be divided.

Next, operation of the strain detection element 200 according to the present embodiment will be described.

Figure 5A:
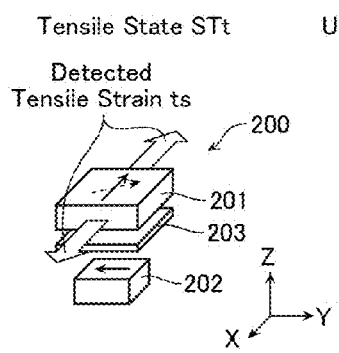
FIG. 5A, FIG. 5B, and FIG. 5C are schematic views for explaining operation of the strain detection element 200.
Figure 5B:
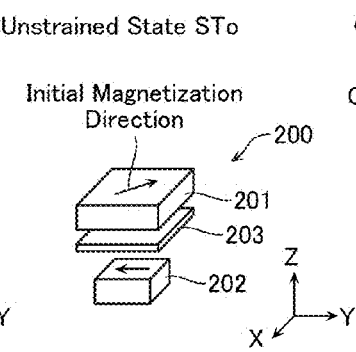
Figure 5C:
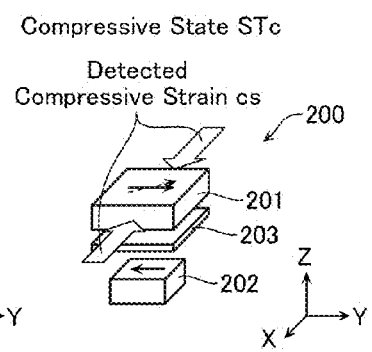

FIGS. 5A to 5C are schematic perspective views exemplifying operation of the strain detection element 200 according to the first embodiment.

FIG. 5A corresponds to a state (tensile state) when a tensile force ts has been applied to the strain detection element 200 and a strain has occurred. FIG. 5B corresponds to a state (unstrained state) when the strain detection element 200 does not have a strain. FIG. 5C corresponds to a state (compressive state) when a compressive force cs has been applied to the strain detection element 200 and a strain has occurred.

In order to make the drawings more easily seen, FIGS. 5A to 5C depict the first magnetic layer 201, the second magnetic layer 202, and the intermediate layer 203. In this example, the first magnetic layer 201 is a magnetization free layer, and the second magnetic layer 202 is a magnetization fixed layer.

Operation where the strain detection element 200 functions as a strain sensor is based on application of an "inverse magnetostriction effect" and a "magnetoresistance effect". The "inverse magnetostriction effect" is obtained in a ferromagnetic layer employed in a magnetization free layer. The "magnetoresistance effect" is expressed in a stacked film of a magnetization free layer, an intermediate layer, and a reference layer (for example, a magnetization fixed layer).

The "inverse magnetostriction effect" is a phenomenon where magnetization of a ferromagnetic body changes due to a strain occurring in the ferromagnetic body. That is, when an external strain is applied to a stacked body of a strain detection element, a magnetization direction of the magnetization free layer changes. As a result, a relative angle between the magnetization of the magnetization free layer and the magnetization of the reference layer (for example, the magnetization fixed layer) changes. A change in electrical resistance is caused by the "magnetoresistance effect (MR effect)" at this time. The MR effect includes, for example a GMR (Giant magnetoresistance) effect or a TMR (Tunneling magnetoresistance) effect, and so on. The MR effect is expressed by passing a current through the stacked body and reading a change in relative angle of inclination of magnetizations as an electrical resistance change. For example, a strain occurs in the stacked body (strain detection element), magnetization direction of the magnetization free layer changes due to the strain, and the relative angle between the magnetization direction of the magnetization free layer and the magnetization direction of the reference layer (for example, the magnetization fixed layer) changes. That is, the MR effect is expressed due to the inverse magnetostriction effect.

When a ferromagnetic material employed in the magnetization free layer has a positive magnetostriction coefficient, the direction of magnetization changes such that an angle between the direction of magnetization and a direction of a tensile strain becomes smaller, and an angle between the direction of magnetization and a direction of a compressive strain becomes larger. When a ferromagnetic material employed in the magnetization free layer has a negative magnetostriction coefficient, the direction of magnetization changes such that an angle between the direction of magnetization and a direction of a tensile strain becomes larger, and an angle between the direction of magnetization and a direction of a compressive strain becomes smaller.

In the case where a combination of materials of the stacked body of the magnetization free layer, the intermediate layer, and the reference layer (for example, the magnetization fixed layer) has a positive magnetoresistance effect, electrical resistance decreases when the relative angle between the magnetization free layer and the magnetization fixed layer is small. In the case where a combination of materials of the stacked body of the magnetization free layer, the intermediate layer, and the reference layer (for example, the magnetization fixed layer) has a negative magnetoresistance effect, electrical resistance increases when the relative angle between the magnetization free layer and the magnetization fixed layer is small.

Described below is an example of change in magnetization for an example of the case where the ferromagnetic materials employed in the magnetization free layer and the reference layer (for example, the magnetization fixed layer) each have a positive magnetostriction constant and the stacked body including the magnetization free layer, the intermediate layer, and the reference layer (for example, the magnetization fixed layer) has a positive magnetoresistance effect.

As expressed in FIG. 5B, in an unstrained state STo (for example, an initial state) where there is no strain, the relative angle between the magnetization of the first magnetic layer (the magnetization free layer) 201 and the magnetization of the second magnetic layer (for example, the magnetization fixed layer) 202 is set to a certain value. A direction of magnetization of a magnetic layer in an initial state of the first magnetic layer 201 is set by, for example, hard bias or shape anisotropy of the magnetic layer, and so on. At this time, a preferable example of an initial magnetization direction setting due to hard bias is a setting of a direction inclined at substantially 45 degrees to a direction of application of a stress. With a view to broadened range, an angle of inclination is preferably 30 to 60 degrees. Doing so makes it possible to obtain an output signal that changes linearly whichever of the cases of a tensile force ts or a compressive force cs has occurred. In this example, the magnetization of the first magnetic layer 201 and the magnetization of the second magnetic layer 202 intersect each other in the initial state.

As shown in FIG. 5A, when the tensile force ts is applied in a tensile state STt, a strain corresponding to the tensile force ts occurs in the strain detection element 200. At this time, the magnetization of the first magnetic layer 201 in the tensile state STt changes from the unstrained state STo such that a relative angle between the magnetization of magnetization free layer 210 and a direction of the tensile force ts becomes smaller. In the example shown in FIG. 5A, the relative angle between the magnetization of the first magnetic layer 201 and the magnetization of the second magnetic layer 202 becomes smaller in the case that the tensile force ts is applied, compared to in the unstrained state STo. As a result, the electrical resistance in the strain detection element 200 decreases compared to the electrical resistance during the unstrained state STo.

On the other hand, as shown in FIG. 5C, when the compressive force cs is applied in a compressive state STc, the magnetization of the first magnetic layer 201 in the compressive state STc changes from the unstrained state STo such that an angle between the magnetization of the first magnetic layer 201 and a direction of the compressive force cs becomes larger.

In the example shown in FIG. 5C, the relative angle between the magnetization of the first magnetic layer 201 and the magnetization of the second magnetic layer 202 becomes larger in the case that the compressive force cs is applied, compared to in the unstrained state STo. As a result, the electrical resistance in the strain detection element 200 increases.

Thus, in the strain detection element 200, a change in strain occurring in the strain detection element 200 is converted into a change in electrical resistance of the strain detection element 200. In the above-described operation, an amount of change in electrical resistance (dR/R) per unit strain (dε) is called a gauge factor (GF). Employing a strain detection element having a high gauge factor makes it possible to obtain a strain sensor of high sensitivity.

Next, configuration examples of the strain detection element 200 according to the present embodiment will be described with reference to FIGS. 6 to 12. Note that below, a description of "material A/material B" indicates a state where a layer of material B is provided on a layer of material A.

Figure 6:
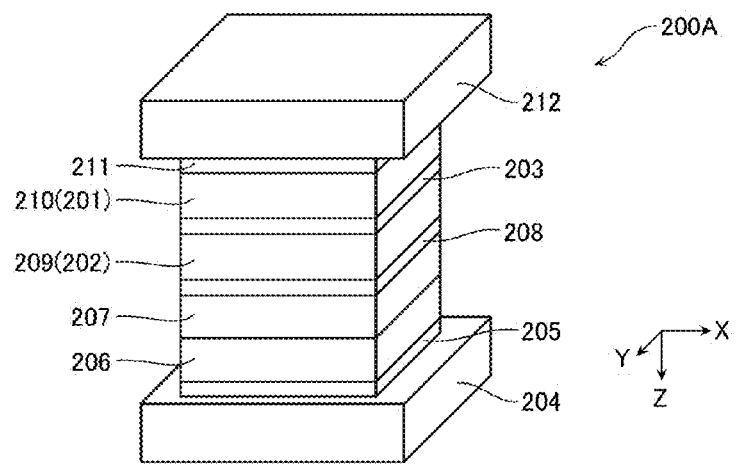
FIG. 6 is a schematic perspective view showing a configuration example of the same strain detection element.

FIG. 6 is a schematic perspective view showing one configuration example 200A of the strain detection element 200. As shown in FIG. 6, the strain detection element 200A is configured having stacked therein, sequentially from below: a lower electrode 204; a base layer 205; a pinning layer 206; a second magnetization fixed layer 207; a magnetic coupling layer 208; a first magnetization fixed layer 209 (the second magnetic layer 202); the intermediate layer 203; a magnetization free layer 210 (the first magnetic layer 201); a cap layer 211; and an upper electrode 212. The first magnetization fixed layer 209 corresponds to the second magnetic layer 202. The magnetization free layer 210 corresponds to the first magnetic layer 201. Moreover, the lower electrode 204 is connected to, for example, the wiring line C1 (FIG. 1), and the upper electrode 212 is connected to, for example, the wiring line C2 (FIG. 1). However, when, for example, the first magnetic layer 201 is divided, the upper electrode connected to one of the first magnetic layers 201 may be connected to the wiring line C1 (FIG. 1) and the upper electrode connected to the other of the first magnetic layers 201 may be connected to the wiring line C2 (FIG. 1). Similarly, when, for example, the second magnetic layer 202 is divided, the lower electrode connected to one of the second magnetic layers 202 may be connected to the wiring line C1 (FIG. 1) and the lower electrode connected to the other of the second magnetic layers 202 may be connected to the wiring line C2 (FIG. 1).

Employed in the base layer 205 is, for example, a stacked film of tantalum and ruthenium (Ta/Ru). A thickness (length in a Z axis direction) of a Ta layer thereof is, for example, 3 nanometers (nm). A thickness of a Ru layer thereof is, for example, 2 nm. Employed in the pinning layer 206 is, for example, an IrMn layer having a thickness of 7 nm. Employed in the second magnetization fixed layer 207 is, for example, a $Co_{75}Fe_{25}$ layer having a thickness of 2.5 nm. Employed in the magnetic coupling layer 208 is, for example, a Ru layer having a thickness of 0.9 nm. Employed in the first magnetization fixed layer 209 is, for example, a $Co_{40}Fe_{40}B_{20}$ layer having a thickness of 3 nm. Employed in the intermediate layer 203 is, for example, a MgO layer having a thickness of 1.6 nm. Employed in the magnetization free layer 210 is, for example, $Co_{40}Fe_{40}B_{20}$ having a thickness of 4 nm. Employed in the cap layer 211 is, for example, Ta/Ru. A thickness of a Ta layer thereof is, for example, 1 nm. A thickness of a Ru layer thereof is, for example, 5 nm.

Employed in the lower electrode 204 and the upper electrode 212 is, for example, at least one of aluminum (Al), an aluminum copper alloy (Al—Cu), copper (Cu), silver (Ag), and gold (Au). Employing such materials having a comparatively small electrical resistance as the lower electrode 204 and the upper electrode 212 makes it possible to pass a current efficiently through the strain detection element 200A. A nonmagnetic material may be employed in the lower electrode 204 and the upper electrode 212.

The lower electrode 204 and the upper electrode 212 may, for example, include: a base layer dedicated for the lower electrode 204 and the upper electrode 212 (not illustrated); a cap layer dedicated for the lower electrode 204 and the upper electrode 212 (not illustrated); and a layer of at least one of Al, Al—Cu, Cu, Ag, and Au, provided between the base layer and cap layer. For example, employed in the lower electrode 204 and the upper electrode 212 is the likes of tantalum (Ta)/copper (Cu)/tantalum (Ta). Employing Ta as the base layer dedicated for the lower electrode 204 and the upper electrode 212 results in adhesion between the substrate 110 and the lower electrode 204 and upper electrode 212 being improved, for example. Titanium (Ti) or titanium nitride (TiN), and so on, may be employed as the base layer dedicated for the lower electrode 204 and the upper electrode.

Employing Ta as the cap layer dedicated for the lower electrode 204 and the upper electrode 212 makes it possible to avoid oxidation of the likes of copper (Cu) below the cap layer. Titanium (Ti) or titanium nitride (TiN), and so on, may be employed as the cap layer dedicated for the lower electrode 204 and the upper electrode 212.

Employable in the base layer 205 is, for example, a stacked structure including a buffer layer (not illustrated) and a seed layer (not illustrated). This buffer layer eases surface roughness of the lower electrode 204 or the membrane 120, and so on, and improves crystallinity of a layer stacked on this buffer layer, for example. Employed as the buffer layer is, for example, at least one selected from the group of tantalum (Ta), titanium (Ti), vanadium (V), tungsten (W), zirconium (Zr), hafnium (Hf), and chromium (Cr). An alloy including at least one material selected from these materials may be employed as the buffer layer.

A thickness of the buffer layer in the base layer 205 is preferably not less than 1 nm and not more than 10 nm. The thickness of the buffer layer is more preferably not less than 1 nm and not more than 5 nm. If the buffer layer is too thin, a buffer effect is lost. If the buffer layer is too thick, the strain detection element 200A becomes excessively thick. The seed layer is formed on the buffer layer, and that seed layer may have a buffer effect. In this case, the buffer layer may be omitted. Employed in the buffer layer is, for example, a Ta layer having a thickness of 3 nm.

The seed layer in the base layer 205 controls crystalline orientation of a layer stacked on the seed layer. The seed layer controls the crystalline particle diameter of the layer stacked on the seed layer. Employed as the seed layer are the likes of a metal of fcc structure (face-centered cubic structure), hcp structure (hexagonal close-packed structure), or bcc structure (body-centered cubic structure).

Employing ruthenium (Ru) of hcp structure, or NiFe of fcc structure, or Cu of fcc structure as the seed layer in the base layer 205 makes it possible to set a crystalline orientation of a spin valve film on the seed layer to an fcc (111) orientation. Employed in the seed layer is, for example, a Cu layer having a thickness of 2 nm, or a Ru layer having a thickness of 2 nm. When raising crystalline orientation of the layer formed on the seed layer, a thickness of the seed layer is preferably not less than 1 nm and not more than 5 nm. The thickness of the seed layer is more preferably not less than 1 nm and not more than 3 nm. As a result, a function as a seed layer of improving crystalline orientation is sufficiently displayed.

On the other hand, when, for example, there is no need to cause crystalline orientation of the layer formed on the seed layer (when, for example, forming an amorphous magnetization free layer, and so on), the seed layer may be omitted. Employed as the seed layer is, for example, a Cu layer having a thickness of 2 nm.

The pinning layer 206 gives unidirectional anisotropy to the second magnetization fixed layer 207 (ferromagnetic layer) formed on the pinning layer 206, and thereby fixes magnetization of the second magnetization fixed layer 207. Employed in the pinning layer 206 is, for example, an antiferromagnetic layer. Employed in the pinning layer 206 is, for example, at least one selected from the group of Ir—Mn, Pt—Mn, Pd—Pt—Mn, Ru—Mn, Rh—Mn, Ru—Rh—Mn, Fe—Mn, Ni—Mn, Cr—Mn—Pt, and Ni—O. It is also possible to employ an alloy having an additional element further added to the Ir—Mn, Pt—Mn, Pd—Pt—Mn, Ru—Mn, Rh—Mn, Ru—Rh—Mn, Fe—Mn, Ni—Mn, Cr—Mn—Pt, and Ni—C. A thickness of the pinning layer 206 is appropriately set to give sufficiently strong unidirectional anisotropy.

In order to perform fixing of magnetization of the ferromagnetic layer contacting the pinning layer 206, heat treatment during magnetic field application is performed. Magnetization of the ferromagnetic layer contacting the pinning layer 206 is fixed in a direction of the magnetic field applied during the heat treatment. Annealing temperature is set to, for example, a temperature greater than or equal to a magnetization fixing temperature of an antiferromagnetic material employed in the pinning layer 206. Moreover, when an antiferromagnetic layer including Mn is employed, Mn sometimes diffuses to a layer other than the pinning layer 206 to lower an MR change rate. Hence, the annealing temperature is desirably set to a temperature less than or equal to a temperature at which diffusion of Mn occurs. The annealing temperature may be set to, for example, not less than 200° C. and not more than 500° C. Preferably, it may be set to, for example, not less than 250'C and not more than 400° C.

When PtMn or PdPtMn are employed as the pinning layer 206, the thickness of the pinning layer 206 is preferably not less than 8 nm and not more than 20 nm. The thickness of the pinning layer 206 is more preferably not less than 10 nm and not more than 15 nm. When IrMn is employed as the pinning layer 206, unidirectional anisotropy may be given by a pinning layer 206 which is thinner than when PtMn is employed as the pinning layer 206. In this case, the thickness of the pinning layer 206 is preferably not less than 4 nm and not more than 18 nm. The thickness of the pinning layer 105 is more preferably not less than 5 nm and not more than 15 nm. Employed in the pinning layer 206 is, for example, an $Ir_{22}Mn_{78}$ layer having a thickness of 7 nm.

A hard magnetic layer may be employed as the pinning layer 206. Employed as the hard magnetic layer is, for example, a hard magnetic material of comparatively high magnetic anisotropy and coercivity such as Co—Pt, Fe—Pt, Co—Pd, Fe—Pd, and so on. Moreover, an alloy having an additional element further added to Co—Pt, Fe—Pt, Co—Pd, and Fe—Pd, may be employed. Employable as the hard magnetic layer is, for example, CoPt (where a percentage of Co is not less than 50 at. % and not more than 85 at. %), $(Co_xPt_{100-x})_{100-y}Cr_y$ (where x is not less than 50 at. % and not more than 85 at. %, and y is not less than 0 at. % and not more than 40 at. %), or FePt (where a percentage of Pt is not less than 40 at. % and not more than 60 at. %), and so on.

Employed in the second magnetization fixed layer 207 is, for example, a $Co_xFe_{100-x}$ alloy (where x is not less than 0 at. % and not more than 1.00 at. %), a $Ni_xFe_{100-x}$ alloy (where z is not less than 0 at. % and not more than 100 at. %), or a material having a nonmagnetic element added to these alloys. Employed as the second magnetization fixed layer 207 is, for example, at least one selected from the group of Co, Fe, and Ni. It is also possible to employ as the second magnetization fixed layer 207 an alloy including at least one material selected from these materials. Also employable as the second magnetization fixed layer 207 is a $(Co_xFe_{100-x})_{100-y}B_y$ alloy (where x is not less than 0 at. % and not more than 100 at. %, and y is not less than 0 at. % and not more than 30 at. %). Employing an amorphous alloy of $(Co_xFe_{100-x})_{100-y}B_y$ as the second magnetization fixed layer 207 makes it possible to suppress variation of characteristics of the strain detection element 200A even when size of the strain detection element is small.

A thickness of the second magnetization fixed layer 207 is preferably not less than 1.5 nm and not more than 5 nm, for example. As a result, for example, intensity of a unidirectional anisotropic magnetic field due to the pinning layer 206 can be more greatly strengthened. For example, intensity of an antiferromagnetic coupling magnetic field between the second magnetization fixed layer 207 and the first magnetization fixed layer 209 can be more greatly strengthened, via the magnetic coupling layer formed on the second magnetization fixed layer 207. For example, magnetic film thickness (product (BE·t) of saturation magnetization Bs and thickness t) of the second magnetization fixed layer 207 is preferably substantively equal to magnetic film thickness of the first magnetization fixed layer 209.

Saturation magnetization of $Co_{40}Fe_{40}B_{20}$ with a thin film is approximately 1.9 T (tesla). For example, when a $Co_xFe_{40}B_{20}$ layer having a thickness of 3 nm is employed as the first magnetization fixed layer 209, the magnetic film thickness of the first magnetization fixed layer 209 is 1.9 T×3 nm, that is, 5.7 Tnm. On the other hand, saturation magnetization of $Co_{75}Fe_{25}$ is approximately 2.1 T. The thickness of the second magnetization fixed layer 207 at which a magnetic film thickness equal to that described above can be obtained is 5.7 Tnm/2.1 T, that is, 2.7 nm. In this case, a $Co_{75}Fe_{25}$ layer having a thickness of approximately 2.7 nm is preferably employed in the second magnetization fixed layer 207. Employed as the second magnetization fixed layer 207 is, for example, a $Co_{75}Fe_2$ layer having a thickness of 2.5 nm.

In the strain detection element 200A, a synthetic pin structure of the second magnetization fixed layer 207, the magnetic coupling layer 208, and the first magnetization fixed layer 209 is employed. Instead, a single pin structure configured from a single magnetization fixed layer may be employed. When the single pin structure is employed, a $Co_{40}Fe_{40}B_{20}$ layer having a thickness of 3 nm, for example, is employed as the magnetization fixed layer. The same material as the above-mentioned material of the second magnetization fixed layer 207 may be employed as the ferromagnetic layer employed in the single pin structure magnetization fixed layer.

The magnetic coupling layer 208 generates antiferromagnetic coupling between the second magnetization fixed layer 207 and the first magnetization fixed layer 209. The magnetic coupling layer 208 forms a synthetic pin structure. Employed as a material, of the magnetic coupling layer 208 is, for example, Ru. A thickness of the magnetic coupling layer 208 is preferably not less than 0.8 nm and not more than 1 nm, for example. A material other than Ru may be employed as the magnetic coupling layer 208, provided it is a material generating sufficient antiferromagnetic coupling between the second magnetization fixed layer 207 and the first magnetization fixed layer 209. The thickness of the magnetic coupling layer 208 may be set to a thickness of not less than 0.8 nm and not more than 1 nm corresponding to a second peak of RKKY (Ruderman-Kittel-Kasuya-Yosida) coupling. Furthermore, the thickness of the magnetic coupling layer 208 may be set to a thickness of not less than 0.3 nm and not more than 0.6 nm corresponding to a first peak of RKKY coupling. Employed as the material of the magnetic coupling layer 208 is, for example, Ru having a thickness of 0.9 nm. As a result, highly reliable coupling can be more stably obtained.

A magnetic layer employed in the first magnetization fixed layer 209 (second magnetic layer 202) contributes directly to the MR effect. Employed as the first magnetization fixed layer 209 is, for example, a Co—Fe—B alloy. Specifically, a $(Co_xFe_{100-x})_{100-y}B_y$ alloy (where x is not less than 0 at. % and not more than 100 at. %, and y is not less than 0 at. % and not more than 30 at. %) may also be employed as the first magnetization fixed layer 209. When an amorphous alloy of $(Co_xFe_{100-x})_{100-y}B_y$ is employed as the first magnetization fixed layer 209, variation between elements due to crystalline particles can be suppressed even when, for example, size of the strain detection element 200A is small.

A layer formed on the first magnetization fixed layer 209 (for example, a tunnel insulating layer (not illustrated) can be planarized. Planarization of the tunnel insulating layer makes it possible to reduce defect density of the tunnel insulating layer. As a result, a larger MR change rate can be obtained by a lower sheet resistivity. For example, when Mg—O is employed as a material of the tunnel insulating layer, employing an amorphous alloy of $(Co_xFe_{100-x})_{100-y}B_y$ as the first magnetization fixed layer 209 makes it possible to strengthen (100) orientation of an Mg—O layer formed on the tunnel insulating layer. More greatly raising the (100) orientation of the Mg—O layer enables an even larger MR change rate to be obtained. The $(Co_xFe_{100-x})_{100-y}B_y$ alloy crystallizes adopting a (100) surface of the Mg—O layer as a template during annealing. Therefore, good crystal conformity can be obtained between the Mg—O and the $(Co_xFe_{100-x})_{100-y}B_y$ alloy. Obtaining good crystal conformity enables an even larger MR change rate to be obtained.

An Fe—Co alloy, for example, may be employed as the first magnetization fixed layer 209, besides the Co—Fe—B alloy.

If the first magnetization fixed layer 209 is thicker, a larger MR change rate is obtained. In order to obtain a larger fixed magnetic field, it is more preferable for the first magnetization fixed layer 209 to be thin. There is a tradeoff relationship in the thickness of the first magnetization fixed layer 209 between the MR change rate and the fixed magnetic field. When a Co—Fe—B alloy is employed as the first magnetization fixed layer 209, the thickness of the first magnetization fixed layer 209 is preferably not less than 1.5 nm and not more than 5 nm. The thickness of the first magnetization fixed layer 209 is more preferably not less than 2.0 nm and not more than 4 nm.

Employed in the first magnetization fixed layer 209, besides the above-mentioned materials, is a $Co_{90}Fe_{10}$ alloy of fcc structure, or Co of hcp structure, or a Co alloy of hcp structure. Employed as the first magnetization fixed layer 209 is at least one selected from the group of Co, Fe, and Ni. Employed as the first magnetization fixed layer 209 is an alloy including at least one material selected from these materials. Employing a bcc structure FeCo alloy material, a Co alloy including a cobalt composition of 50% or more, or a material (Ni alloy) having a Ni composition of 50% or more, as the first magnetization fixed layer 209 results in, for example, a larger MR change rate being obtained.

It is also possible to employ as the first magnetization fixed layer 209 a Heusler magnetic alloy layer of the likes of, for example, $Co_2MnGe$, $Co_2FeGe$, $Co_2MnSi$, $Co_2FeSi$, $Co_2MnAl$, $Co_2FeAl$, $Co_2MnGa_{0.5}Ge_{0.5}$, and $Co_2FeGa_{0.5}Ge_{0.5}$. For example, employed as the first magnetization fixed layer 209 is a $Co_{40}Fe_{40}B_{20}$ layer having a thickness of 3 nm.

The intermediate layer 203 decouples magnetic coupling between the first magnetic layer 201 and the second magnetic layer 202, for example. Employed in a material of the intermediate layer 203 is, for example, a metal or an insulator or a semiconductor. Employed as the metal is, for example, Cu, Au, or Ag, and so on. When a metal is employed as the intermediate layer 203, a thickness of the intermediate layer is, for example, about not less than 1 nm and not more than 7 nm. Employed as the insulator or semiconductor are, for example, the likes of a magnesium oxide (MgO, and so on), an aluminum oxide ($Al_2O_3$, and so on), a titanium oxide (TiO, and so on), a zinc oxide (Zn—O, and so on), or gallium oxide (Ga—O). When an insulator or semiconductor is employed as the intermediate layer 203, the thickness of the intermediate layer 203 is, for example, about not less than 0.6 nm and not more than 2.5 nm. Also employable as the intermediate layer 203 is, for example, a CCP (Current-Confined-Path) spacer layer. When a CCP spacer layer is employed as the spacer layer, a structure in which, for example, a copper (Cu) metal path is formed in the insulating layer of aluminum oxide ($Al_2O_3$), is employed. For example, employed as the intermediate layer is a MgO layer having a thickness of 1.6 nm.

A ferromagnetic body material is employed in the magnetization free layer 210 (first magnetic layer 201). Employable in the magnetization free layer 210 is, for example, a ferromagnetic body material including Fe, Co, and Ni. Employed as a material of the magnetization free layer 210 are, for example, an FeCo alloy, an NiFe alloy, and so on. Furthermore, employed in the magnetization free layer 210 are the likes of a Co—Fe—B alloy, an Fe—Co—Si—B alloy, an Fe—Ga alloy of large λs (magnetostriction constant), an Fe—Co—Ga alloy, a Tb-M-Fe alloy, a Tb-M1-Fe-M2 alloy, an Fe-M3-M4-B alloy, Ni, Fe—Al, or ferrite. In the previously mentioned Tb-M-Fe alloy, M is at least one selected from the group of Sm, Eu, Gd, Dy, Ho, and Er. In the previously mentioned Tb-M1-Fe-M2 alloy, M1 is at least one selected from the group of Sm, Eu, Gd, Dy, Ho, and Er. M2 is at least one selected from the group of Ti, Cr, Mn, Co, Cu, Nb, Mo, W, and Ta. In the previously mentioned Fe-M3-M4-B alloy, M3 is at least one selected from the group of Ti, Cr, Mn, Co, Cu, Nb, Mo, W, and Ta. M4 is at least one selected from the group of Ce, Pr, Nd, Sm, Tb, Dy, and Er. Examples of the previously mentioned ferrite include $Fe_3O_4$, $(FeCo)_3O_4$ and so on. A thickness of the magnetization free layer 210 is, for example, 2 nm or more.

Employable in the magnetization free layer 210 is a magnetic material containing boron. Employable in the magnetization free layer 210 is, for example, an alloy including at least one element selected from the group of Fe, Co, and Ni, and boron (B). For example, the likes of a Co—Fe—B alloy or an Fe—B alloy can be employed. For example, a $Co_{40}Fe_{40}B_0$ alloy can be employed. When an alloy including at least one element selected from the group of Fe, Co, and Ni, and boron (B) is employed in the magnetization free layer 210, the likes of Ga, Al, Si, or W may be added as an element promoting high magnetostriction. For example, an Fe—Ga—B alloy, an Fe—Co—Ga—B alloy, or an Fe—Co—Si—B alloy may be employed. Employing such a magnetic material containing boron results in coercivity (Hc) of the strain detection element 200 lowering and facilitates change in magnetization direction with respect to strain. This enables a high strain sensitivity to be obtained.

Boron concentration (for example, composition ratio of boron) in the magnetization free layer 210 is preferably not less than 5 at. % (atomic percent). This makes it easier for an amorphous structure to be obtained. Boron concentration in the magnetization free layer is preferably not more than 35 at. %. If boron concentration is too high, the magnetostriction constant decreases, for example. Boron concentration in the magnetization free layer is preferably not less than 5 at. 3 and not more than 35 at. %, and is more preferably not less than 10 at. % and not more than 30 at. %, for example.

Employing $Fe_{1-y}B_y$ (where $0<y\le0.3$) or $(Fe_aX_{1-a})_{1-y}B_y$ (where X=Co or Ni, $0.8\le a<1$, and $0<y\le0.3$) in part of the magnetic layer of the magnetization free layer 210 makes it easy to obtain both a large magnetostriction constant λ and a low coercivity, hence is particularly preferable from a viewpoint of obtaining a high gauge factor. For example, $Fe_{80}B_{20}$ (4 nm) may be employed as the magnetization free layer 210. $Co_{40}Fe_{40}B_{20}$ (0.5 nm)/$Fe_{80}B_{20}$ (4 nm) may be employed as the magnetization free layer.

The magnetization free layer 210 may have a multi-layer structure. When a tunnel insulating layer of MgO is employed as the intermediate layer 203, a portion of the magnetization free layer 210 that contacts the intermediate layer 203 is preferably provided with a layer of a Co—Fe—B alloy. As a result, a high magnetoresistance effect is obtained. In this case, the Co—Fe—B alloy layer is provided on the intermediate layer 203, and another magnetic material having a large magnetostriction constant is provided on the Co—Fe—B alloy layer. When the magnetization free layer 210 has a multi-layer structure, the likes of Co—Fe—B (2 nm)/Fe—Co—Si—B (4 nm), for example, is employed in the magnetization free layer 210.

The cap layer 211 protects a layer provided below the cap layer 211. Employed in the cap layer 211 are, for example, a plurality of metal layers. Employed in the cap layer 211 is, for example, a two-layer structure (Ta/Ru, of a Ta layer and a Ru layer. A thickness of this Ta layer is, for example, 1 nm, and a thickness of this Ru layer is, for example, 5 nm. Another metal layer may be provided instead of the Ta layer or Ru layer, as the cap layer 211. There may be any configuration of the cap layer 211. For example, a nonmagnetic material may be employed as the cap layer 211. Another material may be employed as the cap layer 211, provided said material is capable of protecting the layer provided below the cap layer 211.

When a magnetic material containing boron is employed in the magnetization free layer 210, a diffusion prevention layer not illustrated, of an oxide material or a nitride material, may be provided between the magnetization free layer 210 and the cap layer 211, in order to prevent diffusion of boron. Employing a diffusion prevention layer configured from an oxide layer or a nitride layer makes it possible to suppress diffusion of boron included in the magnetization free layer 210 and maintain an amorphous structure of the magnetization free layer 210. Employable as the oxide material or nitride material employed in the diffusion prevention layer is, specifically, an oxide material or nitride material including an element such as Mg, Al, Si, Ti, V, Cr, Mn, Fe, Co, Ni, Cu, Zn, Zr, Nb, Mo, Pu, Rh, Pd, Ag, Hf, Ta, W, Sn, Cd, Ga, and so on.

Now, since the diffusion prevention layer does not contribute to the magnetoresistance effect, its sheet resistivity is preferably low. For example, sheet resistivity of the diffusion prevention layer is preferably set lower than sheet resistivity of the intermediate layer that contributes to the magnetoresistance effect. From a viewpoint of lowering sheet resistivity of the diffusion prevention layer, an oxide or a nitride of Mg, Ti, V, Zn, Sn, Cd, and Ga whose barrier heights are low, is preferable. An oxide having stronger chemical bonding as a function for suppressing diffusion of boron, is preferable. For example, MgO of 1.5 nm can be employed. Moreover, an oxynitride may be regarded as either an oxide or a nitride.

When an oxide material or nitride material is employed in the diffusion prevention layer, a film thickness of the diffusion prevention layer is preferably not less than 0.5 nm from a viewpoint of sufficiently displaying a function of preventing boron diffusion, and is preferably not more than 5 nm from a viewpoint of lowering sheet resistivity. In other words, the film thickness of the diffusion prevention layer is preferably not less than 0.5 nm and not more than 5 nm, and more preferably not less than 1 nm and not more than 3 nm.

Employable as the diffusion prevention layer is at least one selected from the group of magnesium (Mg), silicon (Si), and aluminum (Al). Employable as the diffusion prevention layer is a material including these light elements. These light elements bond with boron to generate a compound. Formed in a portion including an interface between the diffusion prevention layer and the magnetization free layer 210 is at least one of a Mg—B compound, an Al—B compound, and a Si—B compound, for example. These compounds suppress diffusion of boron.

Another metal layer, and so on, may be inserted between the diffusion prevention layer and the magnetization free layer 210. However, if a distance between the diffusion prevention layer and the magnetization free layer 210 becomes too large, boron diffuses between said layers whereby boron concentration in the magnetization free layer 210 ends up lowering, hence the distance between the diffusion prevention layer and the magnetization free layer 210 is preferably not more than 10 nm, and more preferably not more than 3 nm.

Figure 7:
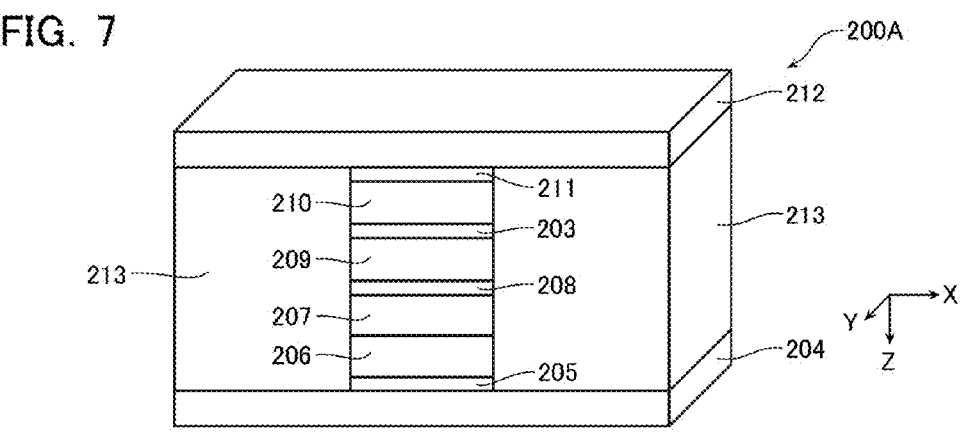
FIG. 7 is a schematic perspective view showing a configuration example of the same strain detection element.

FIG. 7 is a schematic perspective view showing a configuration example of the strain detection element 200A. As shown in FIG. 7, the strain detection element 200A may include an insulating layer (insulating portion) 213 filled between the lower electrode 204 and the upper electrode 212.

Employable in the insulating layer 213 is, for example, an aluminum oxide (for example, $Al_2O_3$) or a silicon oxide (for example, $SiO_2$), and so on. A leak current of the strain detection element 200A can be suppressed by the insulating layer 213.

Figure 8:
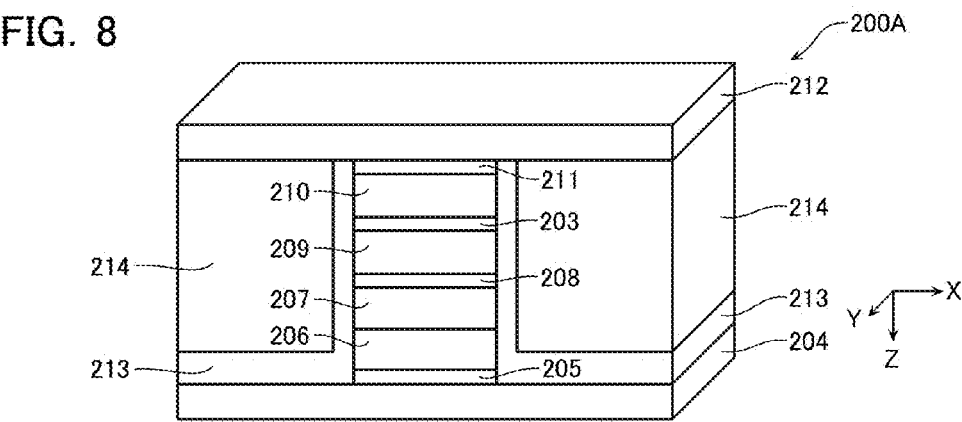
FIG. 8 is a schematic perspective view showing another configuration example of the same strain detection element.

FIG. 8 is a schematic perspective view showing another configuration example of the strain detection element 200A. As shown in FIG. 8, the strain detection element 200A may include: two hard bias layers (hard bias portions) 214 provided separated from each other between the lower electrode 204 and the upper electrode 212; and the insulating layer 213 filled between the lower electrode 204 and the hard bias layer 214.

The hard bias layer 214 sets the magnetization direction of the magnetization free layer 210 (first magnetic layer 201) to a desired direction by a magnetization of the hard bias layer 214. The hard bias layer 214 makes it possible to set the magnetization direction of the magnetization free layer 210 (first magnetic layer 201) to a desired direction in a state where a pressure from external is not applied to the membrane.

Employed in the hard bias layer 214 is, for example, a hard magnetic material of comparatively high magnetic anisotropy and coercivity such as Co—Pt, Fe—Pt, Co—Pd, Fe—Pd, and so on. Moreover, an alloy having an additional element further added to Co—Pt, Fe—Pt, Co—Pd, and Fe—Pd may be employed. Employable in the hard bias layer 214 is, for example, CoPt (where a percentage of Co is not less than 50 at. % and not more than 85 at. %), $(Co_xPt_{100-x})_{100-y}Cr_y$ (where x is not less than 50 at. % and not more than 85 at. %, and y is not less than 0 at. % and not more than 40 at. %), or FePt (where a percentage of Pt is not less than 40 at. % and not more than 60 at. %), and so on. When such materials are employed, applying the hard bias layer 214 with an external magnetic field larger than the coercivity of the hard bias layer 214 makes it possible for a direction of magnetization of the hard bias layer 214 to be set (fixed) in a direction of application of the external magnetic field. A thickness (for example, a length along a direction from the lower electrode 204 toward the upper electrode 212) of the hard bias layer 214 is, for example, not less than 5 nm and not more than 50 nm.

When the insulating layer 213 is disposed between the lower electrode 204 and the upper electrode 212, $SiO_x$ or $AlO_x$ may be employed as a material of the insulating layer 213. Furthermore, a base layer not illustrated may be provided between the insulating layer 213 and the hard bias layer 214. When a hard magnetic material of comparatively high magnetic anisotropy and coercivity such as Co—Pt, Fe—Pt, Co—Pd, Fe—Pd, and so on, is employed in the hard bias layer 214, the likes of Cr or Fe—Co may be employed as a material of the base layer for the hard bias layer 214. The above-described hard bias layer 214 may also be applied to any of the later-mentioned strain detection elements.

The hard bias layer 214 may have a structure of being stacked on a hard bias layer-dedicated pinning layer not illustrated. In this case, the direction of magnetization of the hard bias layer 214 can be set (fixed) by exchange coupling between the hard bias layer 214 and the hard bias layer-dedicated pinning layer. In this case, employable in the hard bias layer 214 is a ferromagnetic material configured from at least one of Fe, Co, and Ni, or from an alloy including at least one kind of these metals. In this case, employable in the hard bias layer 214 is, for example, a $Co_xFe_{100-x}$ alloy (where x is not less than 0 at. % and not more than 100 at. %), a $Ni_xFe_{100-x}$ alloy (where x is not less than 0 at. % and not more than 100 at. %), or a material having a nonmagnetic element added to these alloys. Employable as the hard bias layer 214 is a material similar to that of the previously mentioned first magnetization fixed layer 209. Moreover, employable in the hard bias layer-dedicated pinning layer is a material similar to that of the previously mentioned pinning layer 206 in the strain detection element 200A. Moreover, when the hard bias layer-dedicated pinning layer is provided, a base layer of a similar material to that employed in the base layer 205 may be provided below the hard bias layer-dedicated pinning layer. Moreover, the hard bias layer-dedicated pinning layer may be provided to a lower portion of the hard bias layer, or may be provided to an upper portion of the hard bias layer. The magnetization direction of the hard bias layer 214 in this case can be determined by magnetic field-accompanied heat treatment, similarly to in the case of the pinning layer 206.

The above-described hard bias layer 214 and insulating layer 213 may also be applied to any of the strain detection elements 200 described in the present embodiment. Moreover, when the above-mentioned stacked structure of the hard bias layer 214 and the hard bias layer-dedicated pinning layer is employed, an orientation of magnetization of the hard bias layer 214 can be easily maintained even when a large external magnetic field is instantaneously applied to the hard bias layer 214.

Figure 9:
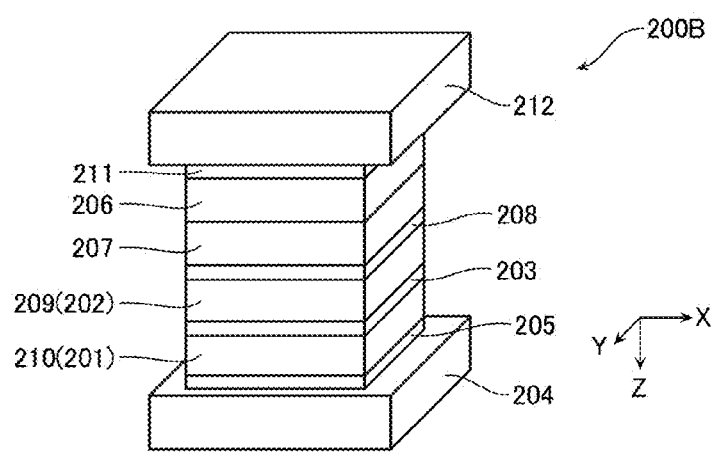
FIG. 9 is a schematic perspective view showing another configuration example of the same strain detection element.

FIG. 9 is a schematic perspective view showing another configuration example 200B of the strain detection element 200. The strain detection element 200B differs from the strain detection element 200A in having a top spin valve type structure. That is, as shown in FIG. 9, the strain detection element 200B is configured having stacked therein, sequentially from below: the lower electrode 204; the base layer 205; the magnetization free layer 210 (first magnetic layer 201); the intermediate layer 203; the first magnetization fixed layer 209 (second magnetic layer 202); the magnetic coupling layer 208; the second magnetization fixed layer 207; the pinning layer 206; the cap layer 211; and the upper electrode 212. The first magnetization fixed layer 209 corresponds to the second magnetic layer 202. The magnetization free layer 210 corresponds to the first magnetic layer 201. Moreover, the lower electrode 204 is connected to, for example, the wiring line C1 (FIG. 1), and the upper electrode 212 is connected to, for example, the wiring line C2 (FIG. 1).

Employed in the base layer 205 is, for example, a stacked film of tantalum and copper (Ta/Cu). A thickness (length in a Z axis direction) of a Ta layer thereof is, for example, 3 nm. A thickness of a Cu layer thereof is, for example, 5 nm.

Employed in the magnetization free layer 210 is, for example, $Co_{40}Fe_{40}B_{20}$ having a thickness of 4 nm. Employed in the intermediate layer 203 is, for example, a MgO layer having a thickness of 1.6 nm. Employed in the first magnetization fixed layer 209 is, for example, $Co_{40}Fe_{40}B_{20}/Fe_{50}Co_{50}$. A thickness of a $Co_{40}Fe_{40}B_{20}$ layer thereof is, for example, 2 nm. A thickness of an $Fe_{50}Co_{50}$ layer thereof is, for example, 1 nm. Employed in the magnetic coupling layer 208 is, for example, a Ru layer having a thickness of 0.9 nm. Employed in the second magnetization fixed layer 207 is, for example, a $Co_{75}Fe_{25}$; layer having a thickness of 2.5 nm. Employed in the pinning layer 206 is, for example, an IrMn layer having a thickness of 7 nm. Employed in the cap layer 211 is, for example, Ta/Ru. A thickness of a Ta layer thereof is, for example, 1 nm. A thickness of a Ru layer thereof is, for example, 5 nm.

In the previously mentioned bottom spin valve type strain detection element 200A, the first magnetization fixed layer 209 (second magnetic layer 202) is formed more downwardly than (−Z axis direction) the magnetization free layer 210 (first magnetic layer 201). In contrast, in the top spin valve type strain detection element 200B, the first magnetization fixed layer 209 (second magnetic layer 202) is formed more upwardly than (+Z axis direction) the magnetization free layer 210 (first magnetic layer 201). Therefore, the materials of each of the layers included in the strain detection element 200A may be used as materials of each of the layers included in the strain detection element 200B, by inverting them in an upside-down manner. Moreover, the above-mentioned diffusion prevention layer may be provided between the base layer 205 and the magnetization free layer 210 of the strain detection element 200B.

Figure 10:
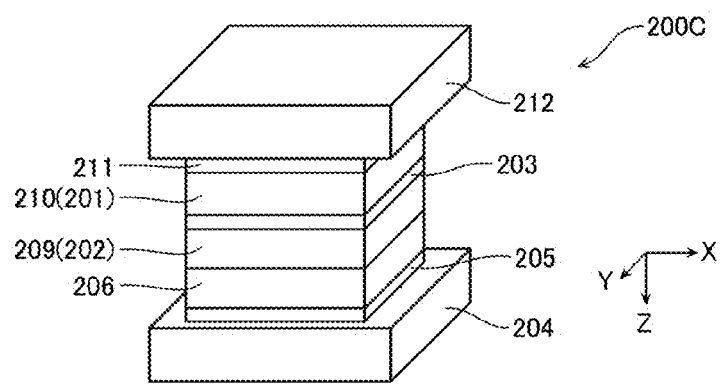
FIG. 10 is a schematic perspective view showing another configuration example of the same strain detection element.

FIG. 10 is a schematic perspective view showing another configuration example 200C of the strain detection element 200. The strain detection element 200C is applied with a single pin structure employing a single magnetization fixed layer. That is, as shown in FIG. 10, the strain detection element 200C is configured having stacked therein, sequentially from below: the lower electrode 204; the base layer 205; the pinning layer 206; the first magnetization fixed layer 209 (second magnetic layer 202); the intermediate layer 203; the magnetization free layer 210 (first magnetic layer 201); the cap layer 211; and the upper electrode 212. The first magnetization fixed layer 209 corresponds to the second magnetic layer 202. The magnetization free layer 210 corresponds to the first magnetic layer 201. Moreover, the lower electrode 204 is connected to, for example, the wiring line C1 (FIG. 1), and the upper electrode 212 is connected to, for example, the wiring line C2 (FIG. 1).

Employed in the base layer 205 is, for example, Ta/Ru. A thickness (length in a Z axis direction) of a Ta layer thereof is, for example, 3 nm. A thickness of a Ru layer thereof is, for example, 2 nm. Employed in the pinning layer 206 is, for example, an IrMn layer having a thickness of 7 nm. Employed in the first magnetization fixed layer 209 is, for example, a $Co_{40}Fe_{40}B_{20}$ layer having a thickness of 3 nm. Employed in the intermediate layer 203 is, for example, a MgO layer having a thickness of 1.6 nm. Employed in the magnetization free layer 210 is, for example, $Co_{40}Fe_{40}B_{20}$ having a thickness of 4 nm. Employed in the cap layer 211 is, for example, Ta/Ru. A thickness of a Ta layer thereof is, for example, 1 nm. A thickness of a Ru layer thereof is, for example, 5 nm.

Materials similar to those of each of the layers of the strain detection element 200A may be employed as materials of each of the layers of the strain detection element 200C.

Figure 11:
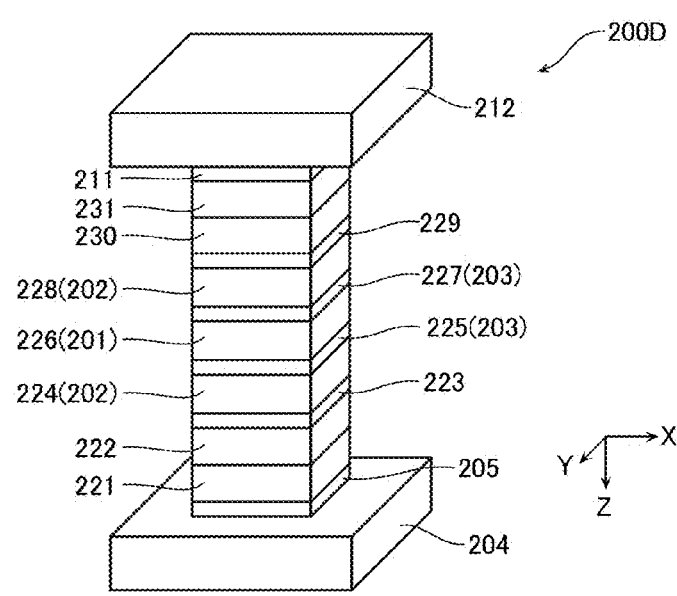
FIG. 11 is a schematic perspective view showing another configuration example of the same strain detection element.

FIG. 11 is a schematic perspective view showing another configuration example 200D of the strain detection element 200. As shown in FIG. 11, the strain detection element 2000 is configured having stacked therein, sequentially from below: the lower electrode 204; the base layer 205; a lower pinning layer 221; a lower second magnetization fixed layer 222; a lower magnetic coupling layer 223; a lower first magnetization fixed layer 224; a lower intermediate layer 225; a magnetization free layer 226; an upper intermediate layer 227; an upper first magnetization fixed layer 228; an upper magnetic coupling layer 229; an upper second magnetization fixed layer 230; an upper pinning layer 231; the cap layer 211; and the upper electrode 212. The lower first magnetization fixed layer 224 and the upper first magnetization fixed layer 228 correspond to the second magnetic layer 202. The magnetization free layer 226 corresponds to the first magnetic layer 201. Moreover, the lower electrode 204 is connected to, for example, the wiring line C1 (FIG. 1), and the upper electrode 212 is connected to, for example, the wiring line C2 (FIG. 1).

Employed in the base layer 205 is, for example, Ta/Ru. A thickness (length in a Z axis direction) of a Ta layer thereof is, for example, 3 nanometers (nm). A thickness of a Pu layer thereof is, for example, 2 nm. Employed in the lower pinning layer 221 is, for example, an IrMn layer having a thickness of 7 nm. Employed in the lower second magnetization fixed layer 222 is, for example, a $Co_{75}Fe_{25}$ layer having a thickness of 2.5 nm. Employed in the lower magnetic coupling layer 223 is, for example, a Ru layer having a thickness of 0.9 nm. Employed in the lower first magnetization fixed layer 224 is, for example, a $Co_{40}Fe_{40}B_{20}$ layer having a thickness of 3 nm. Employed in the lower intermediate layer 225 is, for example, a MgO layer having a thickness of 1.6 nm. Employed in the magnetization free layer 226 is, for example, $Co_{40}Fe_{40}B_{20}$ having a thickness of 4 nm. Employed in the upper intermediate layer 227 is, for example, a MgO layer having a thickness of 1.6 nm. Employed in the upper first magnetization fixed layer 228 is, for example, $Co_{40}Fe_{40}B_{20}/Fe_{50}Co_{50}$. A thickness of a $Co_{40}Fe_{40}B_{20}$ layer thereof is, for example, 2 nm. A thickness of an $Fe_{50}Co_{50}$ layer thereof is, for example, 1 nm. Employed in the upper magnetic coupling layer 229 is, for example, a Ru layer having a thickness of 0.9 nm. Employed in the upper second magnetization fixed layer 230 is, for example, a $Co_{75}Fe_{25}$ layer having a thickness of 2.5 nm. Employed in the upper pinning layer 231 is, for example, an IrMn layer having a thickness of 7 nm. Employed in the cap layer 211 is, for example, Ta/Ru. A thickness of a Ta layer thereof is, for example, 1 nm. A thickness of a Ru layer thereof is, for example, 5 nm.

Materials similar to those of each of the layers of the strain detection element 200A may be employed as materials of each of the layers of the strain detection element 200).

Figure 12:
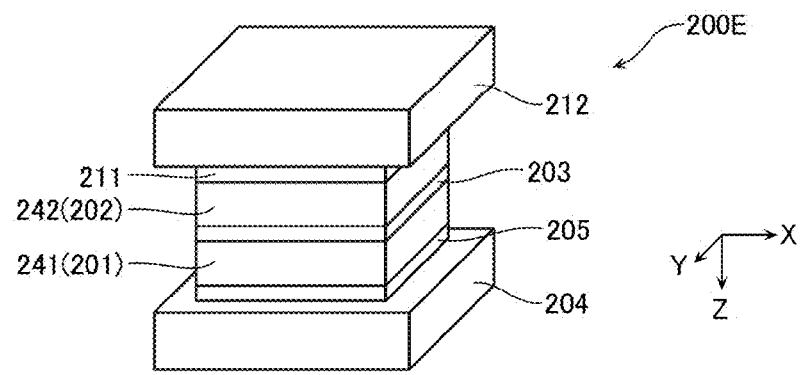
FIG. 12 is a schematic perspective view showing another configuration example of the same strain detection element.

FIG. 12 is a schematic perspective view showing one configuration example 200E of the strain detection element 200. As shown in FIG. 12, the strain detection element 200E is configured having stacked therein, sequentially from below: the lower electrode 204; the base layer 205; a first magnetization free layer 241 (the first magnetic layer 201); the intermediate layer 203; a second magnetization free layer 242 (the second magnetic layer 202); the cap layer 211; and the upper electrode 212. The first magnetization free layer 241 corresponds to the first magnetic layer 201. The second magnetization free layer 242 corresponds to the second magnetic layer 202. Moreover, the lower electrode 204 is connected to, for example, the wiring line C1 (FIG. 1), and the upper electrode 212 is connected to, for example, the wiring line C2 (FIG. 1).

Employed in the base layer 205 is, for example, Ta/Cu. A thickness (length in a Z axis direction) of a Ta layer thereof is, for example, 3 nm. A thickness of a Cu layer thereof is, for example, 5 nm. Employed in the first magnetization free layer 241 is, for example, $Co_{40}Fe_{40}B_{20}$ having a thickness of 4 nm. Employed in the intermediate layer 203 is, for example, $Co_{40}Fe_{40}B_{20}$ having a thickness of 4 nm. Employed in the cap layer 211 is, for example, Cu/Ta/Ru. A thickness of a Cu layer thereof is, for example, 5 nm. A thickness of a Ta layer thereof is, for example, 1 nm. A thickness of a Ru layer thereof is, for example, 5 nm.

Materials similar to those of each of the layers of the strain detection element 200A may be employed as materials of each of the layers of the strain detection element 200E. Moreover, a material similar to that of, for example, the magnetization free layer 210 of the strain detection element 200A (FIG. 6) may be employed as materials of the first magnetization free layer 241 and the second magnetization free layer 242.

Advantages of First Embodiment

The membrane 120 (vibrating portion 121 and supported portion 122) of the first embodiment are each formed by an oxide that includes aluminum (Al) (as an example, aluminum oxide). As previously mentioned, the hollow portion 111 is formed by carrying out etching on the substrate 110 to process the substrate 110 until the membrane 120 is exposed. However, there is a problem that if at that time, the membrane 120 gets etched, then a film thickness of the exposed membrane 120 ends up differing by place depending on a degree of the etching, whereby desired characteristics for the membrane 120 cannot be obtained, leading to lowering of precision of the pressure sensor 110A. This problem will be explained with reference to FIGS. 13 to 17.

Figure 13A:
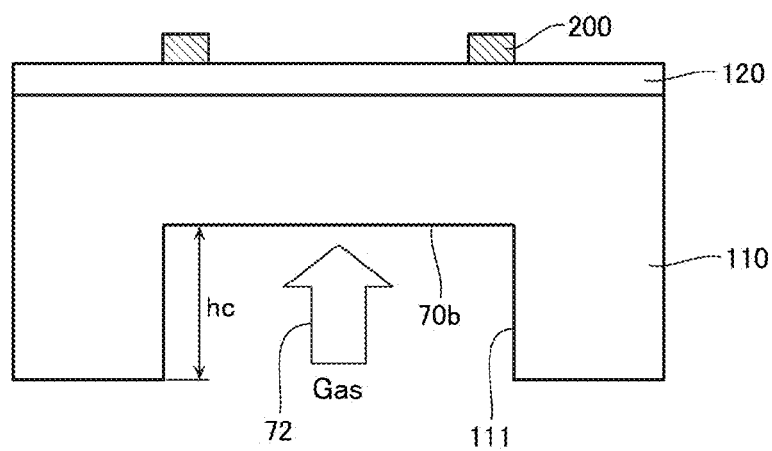
FIG. 13A is a schematic cross-sectional view showing a problem in a processing step of a hollow portion 111 of a pressure sensor 110A of the first embodiment.

FIG. 13A is a schematic view showing a problem in a processing step of the hollow portion 111 of the pressure sensor 110A of the first embodiment. For simplification of illustration, only the detection element 200 is displayed on the membrane 120, and wiring lines, and so on, are not displayed.

The hollow portion 111 is formed by etching the substrate 110 by a RIE method. During processing, etching proceeds by an etching gas 72 and the substrate 110 coming into contact and causing a chemical reaction.

Processing of the hollow portion 111 proceeds, and as a depth of the hollow portion 111 increases, a difference occurs in ease-of-reach of the etching gas 72 at the bottom of the hollow portion 111. Generally, it becomes more difficult for the etching gas 72 to reach an edge, compared to a central portion, of the hollow portion 111.

Figure 13B:
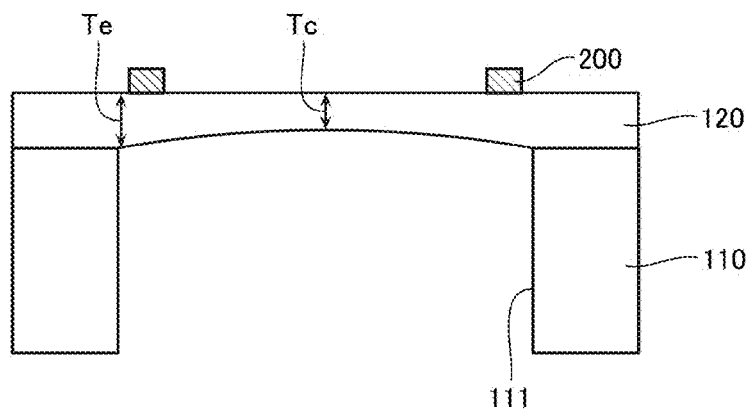
FIG. 13B is a schematic cross-sectional view showing a problem in a processing step of the hollow portion 111 of the pressure sensor 110A of the first embodiment.

Because a difference occurs in ease-of-reach of the etching gas 72 at the bottom of the hollow portion 111 during processing of the hollow portion 111 as described above, a difference also occurs in speed of etching depending on a position in the bottom of the hollow portion 111. As a result, if, for example, it is more difficult for the etching gas 72 to reach the edge compared to the central portion at the bottom of the hollow portion ill, then, as shown in FIG. 13B, a film thickness Tc of the central portion of the membrane 120 after hollow portion 111 processing becomes thin compared to a film thickness Te of the edge thereof.

The supported portion 222 at the edge of the membrane 120 is fixed at an upper surface of the substrate 110, hence, as shown in FIG. 14, when an applied pressure 80 is applied from a hollow portion 111 side and the central portion of the membrane 120 deforms in a convex shape, that edge deforms in a concave shape. Therefore, an inclination of a force applied to the strain detection element 200 by a change in shape of the membrane 120 inverts bounded by a point 120c. A force Ps shows a large value in a narrow range from a boundary point 120d of the membrane 120 and the substrate 110 to the point 120c. Furthermore, there is a distribution in magnitude of the force applied to the strain detection element 200 by deformation of the membrane 120 even between the point 120d and the point 120c, and there exists an extremely narrow region 120e where the force becomes greatest.

The strain detection element 200 of the present embodiment has a smaller volume compared to an ordinary strain detection element using a piezo element, hence has excellent spatial resolution. Therefore, as shown in FIG. 14, the strain detection element 200 can be disposed pinpointedly on the region 120e between the point 120c and the point 120d where a value of the force applied to the strain detection element 200 becomes large on the membrane 120, whereby performance of the strain detection element 200 can be used to a maximum and sensitivity of the pressure sensor can be raised.

As mentioned above, superior performance can be shown by using a strain detection element employing spin technology than in the case of using a conventional piezoelectric element as a strain detection element. However, the technology of the present invention that employs aluminum oxide in a membrane bending by a pressure displays an improving effect even when a piezoelectric element is used. Specifically, it is possible for an element in which a voltage is generated by a polarization effect of electrons of an insulating material when a strain is applied in the manner of PZT, AlN, and so on, to be employed on a membrane 120 of embodiments of the kinds of FIGS. 18, 22, and 23, as a piezoelectric element. In this case also, the membrane 120 of aluminum oxide of the present invention shows an improving effect.

It is possible to know which portion on the membrane 120 corresponds to the region 120e, by theoretical calculation. When performing the theoretical calculation, a structure in which film thickness is uniform is employed in a model of the membrane 120. However, in reality, a distribution exists in film thickness of the membrane 120 as in FIG. 13B. If the actual shape of the membrane 120 at this time differs greatly from the model used in calculation, then a position of the region 120e on the membrane 120 gets misaligned from a position derived by the theoretical calculation. As a result, performance of the strain detection element 200 cannot be used to a maximum, and it ends up being impossible for the pressure sensor of the embodiment to sufficiently extract the performance. It is therefore necessary to bring the shape of the membrane 120 closer to a state where film thickness is uniform, that is, close to the model of the theoretical calculation. As an example, a ratio (Tc/Te) of minimum film thickness Tc and maximum film thickness Te of the membrane 120 can be set to, for example, 0.9 or more, and preferably 0.95 or more.

In order to render the shape of the membrane 120 into a shape where film thickness is uniform, tolerance of the membrane 120 to PIE during formation of the hollow portion 111 must be raised. FIGS. 15A and 15B show a manufacturing step when etching the substrate 110 to form the hollow portion 111.

As shown in FIG. 15A, when processing the substrate 110 by RIE and forming the hollow portion 111, the tolerance to RIE of the membrane 120 is low, hence a depth of the hollow portion 111 due to a difference in ease-of-reach of the etching gas ends up differing greatly by position. FIG. 15A shows as an example the case where it is easier for the etching gas 72 to reach the central portion of the hollow portion 111 than the edge of the hollow portion 111, as a result of which etching is faster and the depth of the hollow portion 111 increases more in the central portion than at the edge of the hollow portion 111. At this time, a difference between a depth of a shallowest portion and a depth of a deepest portion of the hollow portion 111 is assumed to be hc1.

For example, even if etching has reached a lower surface of the membrane 120 at the central portion of the hollow portion 111, a residual portion 111R must be removed by etching for the vibrating portion 121 to achieve its function. However, as shown in FIG. 15B, when it is attempted to remove this residual portion 111F by etching, the membrane 120 close to the central portion of the hollow portion 111 also ends up being partially etched, besides the residual portion 111R. That is, the film thickness of the membrane 120 is not uniform, and a film thickness difference hc3 occurs according to position. As previously mentioned, this is undesirable from a viewpoint of sensitivity of the pressure sensor.

Accordingly, in the present embodiment, the membrane 120 (vibrating portion 121 and supported portion 122) are each configured as a single film formed by an oxide that includes aluminum (Al) (as an example, aluminum oxide (AlOx). The oxide that includes aluminum has a high etch selectivity with respect to silicon. When the membrane 120 is formed by an oxide that includes single aluminum, the thickness of the membrane can be set to not less than 100 nm and not more than 2 μm.

FIG. 16A is a table showing etch selectivity with respect to silicon. In the case where etching employing RIE is performed under the same conditions on silicon and a sample A, when an etching amount of the sample A is 1/X times that of silicon, the etch selectivity with respect to silicon of the sample A is assumed to be X. When the etch selectivity with respect to silicon is defined in the above manner, the etch selectivity with respect to silicon of a silicon oxide film (SiOx) and aluminum oxide (AlOx) are as shown in FIG. 16A. As shown in FIG. 16A, aluminum oxide shows a high etch selectivity of 1050 with respect to silicon.

As a result, in the case that the membrane 120 is configured by aluminum oxide, the film thickness of the membrane 120 is maintained substantially uniformly upward of the hollow portion 111, even when the residual portion 111R is removed by etching and etching for forming the hollow portion 111 is performed in the region R1 until the membrane 120 is exposed. As a result, the film thickness of the membrane 120 can be set to a value as designed, and sensitivity of the pressure sensor 110A can be improved. Moreover, the membrane 120 formed by aluminum oxide has a high tolerance also in etching for forming the strain detection element 200 formed on the membrane 120, hence planarization of an upper surface is secured, whereby uniformity of film thickness of the membrane 120 is maintained. Therefore, performance of the strain detection element 200 can be used to a maximum and sensitivity of the pressure sensor 110A can be raised.

As shown in FIGS. 3A to 3D, sometimes, a plurality of the strain detection elements 200 are disposed on the membrane 120 of the pressure sensor 110A. As a result, improvement of SNR can be achieved as previously mentioned. Electrically connecting a plurality of N of the strain detection elements 200 in series or in parallel in this way enables an improving effect of 20 log√N to be obtained for SNR. Sensitivity of the pressure sensor 310A can be further raised compared to when a single strain detection element 200 is disposed. When it is attempted to raise sensitivity of the pressure sensor by this method, there is a need to align outputs from the disposed individual strain detection elements 200, that is, uniformly align performance of the disposed individual strain detection elements 200. In this respect also, the membrane 120 formed by aluminum oxide and capable of having the film thickness of the entire membrane 120 aligned uniformly is well matched to the pressure sensor 110A.

FIG. 16B is a schematic view for explaining a device for evaluating sensitivity to applied pressure of the vibrating portion 121 of the membrane 220, and an evaluation method thereby. FIG. 16B shows a schematic configuration of the device for evaluating sensitivity of the vibrating portion 121. The pressure sensor 110A is fixed on a plate M2. The plate M2 has a hole M21 of about the same size as the vibrating portion 121 opened therein, and the pressure sensor 110A is fixed such that the hollow portion 111 of the pressure sensor 110A comes above the hole M21. The plate M2 to which the pressure sensor 110A is fixed is attached to a measurement jig M1. The plate M2 configures a lid of the measurement jig M1, and an airtight hollow portion M11 can be made by attaching the plate M2. At this time, the plate M2 is attached to the measurement jig M1 such that the pressure sensor 110A attached to the plate M2 is present on an opposite surface to the hollow portion M11.

Figure 16C:
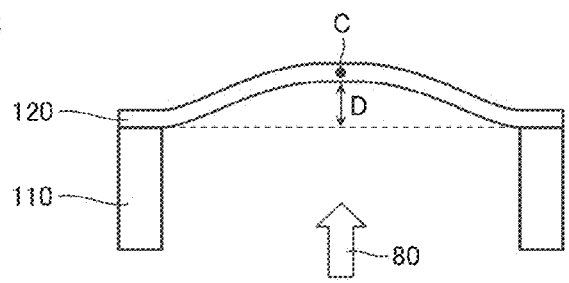
FIG. 16C is a schematic view of a change in shape of the membrane 120 when an applied pressure 80 is applied.

A pressure generator (not illustrated) is attached to the hollow portion M11, and an applied pressure 80 of a set magnitude can be generated within the hollow portion M11. The applied pressure 80 is applied also to the vibrating portion 121 of the pressure sensor 110A linked to the hollow portion M11 via the hole M21. The shape of the membrane 120 changes due to the applied pressure 80 being applied to the vibrating portion 121. This change in shape of the membrane 120 is measured using a laser microscope M3 provided directly above the pressure sensor 110A. FIG. 16C is a schematic view of the change in shape of the membrane 120 when the applied pressure 80 is applied. The vibrating portion 121 bends due to the applied pressure 80 being applied to the membrane 120 via the hollow portion M11. At this time, a displacement amount D in a direction perpendicular to the membrane 120 (Z axis direction) from an initial state when the applied pressure 30 is not applied, of the centroid 120P1 of the vibrating portion 121, is measured by the laser microscope M3. When sensitivity to applied pressure of the vibrating portion 121 is good, a value of the displacement amount D is large even when magnitude of the applied pressure 80 is small. Moreover, when a value of the applied pressure 80 is changed in a small range, the change in value of the displacement amount D is also large.

It will be described by FIGS. 17A to 17D how using an oxide that includes aluminum as the membrane 120 is effective for the pressure sensor 110A.

Figure 17A:
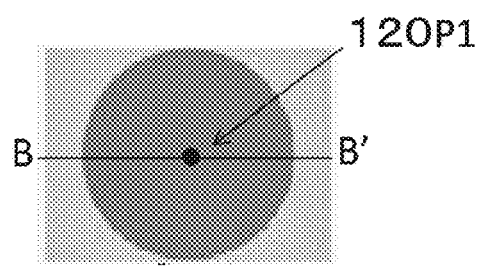
FIG. 17A is actual image data showing a measurement result by a laser microscope M3 in an initial state where the applied pressure 80 from external is not applied, in the case that sputtering-deposited aluminum oxide (AlOx) is employed as a material of the membrane 120.

FIG. 17A is actual image data showing a measurement result by the laser microscope M3 in the initial state where the applied pressure 80 from external is not applied, in the case that sputtering-deposited aluminum oxide (AlOx) is employed as the material of the membrane 120. Residual stress of the membrane 120 before processing of the hollow portion 111 is adjusted to an appropriate value and a circle is adopted as the shape of the vibrating portion 121. Moreover, the diameter of the vibrating portion 121 is set to 530 μm, and the thickness of the membrane 120 is set to 500 nm. Note that for simplicity, FIG. 17A shows a membrane 120 not having the likes of the strain detection element 200 or electrodes connected to the strain detection element 200 disposed thereon. In FIG. 17A, the inside of the circular portion corresponds to the vibrating portion 121, and the outside of the circular portion corresponds to the supported portion 122.

Figure 17B:
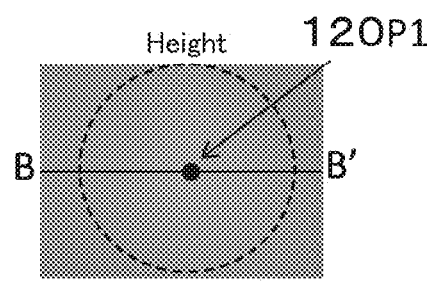
FIG. 17B is a view showing by color contrast a height distribution in a vertical direction (Z axis direction) of the membrane 120 shown in the image data of FIG. 17A.

FIG. 17B is a view showing by color contrast a height distribution in a vertical direction (Z axis direction) of the membrane 120 shown in the image data of FIG. 17A. It is found from the fact that color of FIG. 17B is uniform, that the membrane 120 is flat in the initial state. As will be mentioned later, sometimes, when a large bending occurs in the membrane 120 in the initial state, the strain detection element 200 cannot sufficiently display its performance.

Figure 17C:
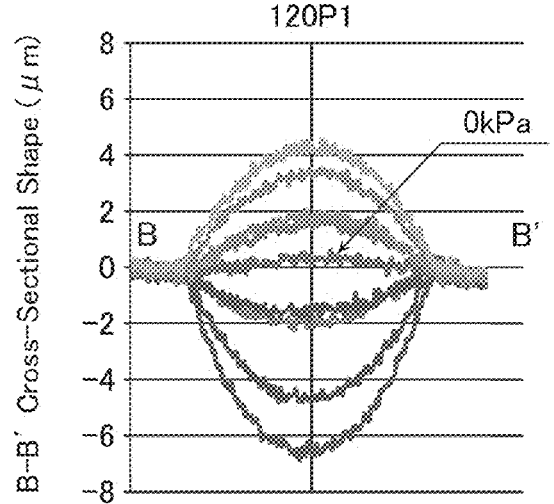
FIG. 17C shows a result of measuring a change in shape in the B-B' cross-section of FIG. 17A by the laser microscope M3, in the case that various applied voltages 80 are applied to the membrane 120.

FIG. 17C shows a result of measuring a change in shape in the B-B' cross-section of FIG. 17A by the laser microscope M3, in the case that values of pressure 80 applied to the membrane 120 are adjusted to −10 kPa, −5 kPa, −1 kPa, −0.5 kPa, 0 kPa, 0.5 kPa, 1 kPa, 5 kPa, and 10 kPa. It is found that shapes of the film to left and right bounded by the centroid 120P1 of the membrane 120 are equal, and forces applied to the strain detection element 200 disposed at the edge of the vibrating portion 121 when the vibrating portion 121 is deformed are equal.

Figure 17D:
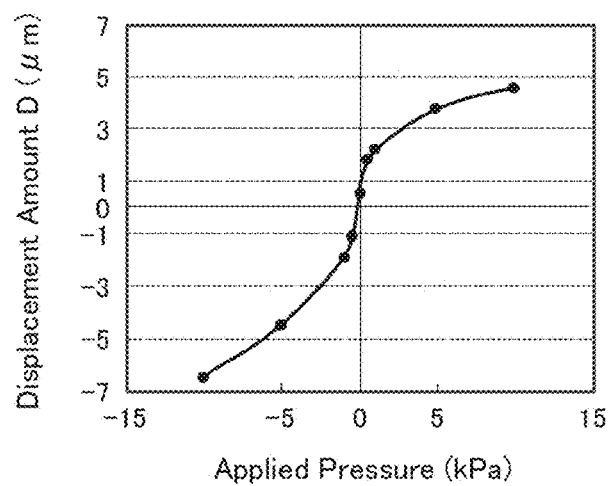
FIG. 17D is a graph assuming the horizontal axis to be the applied pressure 80 and the vertical axis to be a displacement amount D of a centroid 120P1 of the membrane 120, in the case of FIG. 17C.

FIG. 17D is a graph assuming the horizontal axis to be the applied pressure 80 and the vertical axis to be the displacement amount D of the centroid 120P1 of the membrane 120, in the case of FIG. 17C. It is found from this graph that the displacement amount D of the centroid 120P1 of the vibrating portion 121 shows a steep change in a small range of the applied pressure 80 from external. In other words, the membrane 120 responds to a change in applied pressure with good sensitivity. Displacement inclination (m/kPa) as a change in the displacement amount. D per unit applied pressure is defined as an index of steepness of change of the displacement amount D.

The membrane 120 shown in FIG. 17A has a displacement inclination of 3.0 μm/kPa in a range of applied pressure of −0.5 kPa to 0.5 kPa. When the device of the present invention is employed as an acoustic sensor and microphone, the pressure range used is a smaller range, hence it becomes possible to have an even larger displacement inclination in such a pressure range and detect a faint sound with high sensitivity.

It is found from the measurement results shown in FIGS. 17C and 17D that when an oxide that includes aluminum is employed as the membrane 120, it becomes possible to produce a pressure sensor 110A having a membrane in which bending in the initial state is small, moreover in which the shape of the film when bending has occurred is symmetrical, and which responds with good sensitivity to an applied pressure.

Second Embodiment

Figure 18:
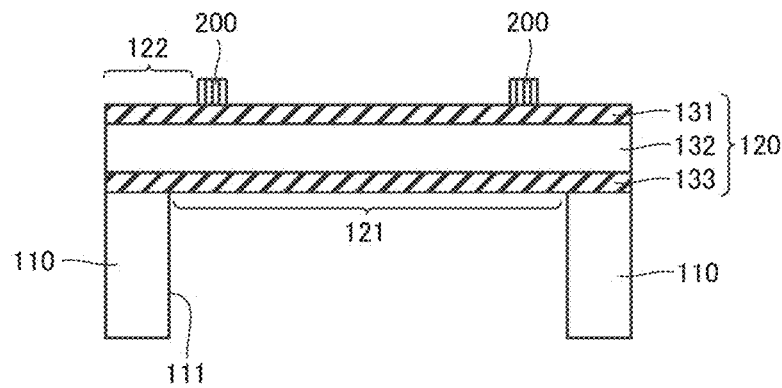
FIG. 18 is a cross-sectional view taken along the line A-A' of FIG. 1, in a pressure sensor of a second embodiment.

Next, a pressure sensor according to a second embodiment will be described with reference to FIG. 18. The pressure sensor of this second embodiment has a configuration of the membrane 120 which differs from that of the first embodiment. Other configurations are similar to those of the first embodiment. In FIG. 18, configurations identical to those of the first embodiment are assigned with reference symbols identical to those assigned in the first embodiment, and detailed descriptions thereof will be omitted below.

FIG. 18 is a schematic cross-sectional view of the A-A' cross-section of FIG. 1. As shown in FIG. 18, the membrane 120 is formed by a three-layer structure of a first film 131 positioned on a strain detection element 200 side, a second film 133 positioned on a substrate 120 side, and an intermediate film 132 between the first film 131 and the second film 133. As will be mentioned later, adopting such a three-layer structure makes it possible to provide a flat membrane 120 in which bending does not occur in the initial state when an applied pressure from external is not applied. In a more preferable embodiment, a difference between a film thickness of the first film 131 and a film thickness of the second film 133 is set to a certain value or less, from a viewpoint of suppression of residual stress.

The first film 131 and the second film 133 are both formed by an oxide that includes aluminum (Al). In the first embodiment, the entire membrane 120 is formed by an oxide that includes aluminum, but in this second embodiment, only an upper surface and a lower surface of the membrane 120 are formed by an oxide that includes aluminum. Since the first film 131 (upper surface of the membrane 120) and the second film 133 (lower surface of the membrane 120) are configured from an oxide that includes aluminum, the pressure sensor 110A of the second embodiment can secure uniformity of film thickness of the membrane 120 and improve precision of the pressure sensor 110A, similarly to in the above-mentioned advantages of the first embodiment. Moreover, in the case of the second embodiment, physical properties such as Young's modulus or Poisson coefficient of the membrane 120 can be controlled to preferable values for the pressure sensor 110A by choosing a material of the intermediate film 132. Note that film thicknesses of the first film 131 and the second film 133 may be set to not less than 10 nm and not more than 300 nm. In this case, the film thicknesses may preferably be set to not less than 30 nm and not more than 150 nm.

The intermediate film 132 can be formed from at least one material selected from the group of an oxide that includes silicon and a nitride that includes silicon, in addition to the oxide that includes aluminum. Besides these, an organic material such as a polymer material may also be used as the material of the intermediate film 132. Examples of the polymer material include the following. For example, the following can be employed, namely acrylonitrile butadiene styrene, a cyclo olefin polymer, elastic ethylene propylene, a polyamide, a polyamide imide, polybenzimidazole, polybutylene terephthalate, a polycarbonate, polyethylene, polyethylene ether ketone, a polyetherimide, polyethylene imine, polyethylene naphthalene, polyester, polysulfone, polyethylene terephthalate, phenol formaldehyde, a polyimide, polymethyl methacrylate, polymethyl pentene, polyoxymethylene, polypropylene, m-phenyl ether, poly p-phenyl sulfide, a p-amide, polystyrene, polysulfone, polyvinyl chloride, polytetrafluoroethylene, perfluoroalkoxy, ethylene propylene fluoride, polytetrafluoroethylene, poly ethylene tetrafluoroethylene, polyethylene chlorotrifluoroethylene, polyvinylidene fluoride, melamine formaldehyde, a liquid crystal polymer, or urea formaldehyde. A film thickness of the intermediate film 132 may be set to not less than 100 nm and not more than 1 μm. In this case, the film thickness may preferably be set to not less than 150 nm and not more than 800 nm.

Note that a buffer film, or the like, illustration of which is omitted, may be interposed between the intermediate film 132 and the first film 131 or second film 133. Moreover, the intermediate film 132 is sometimes a single-layer film and is sometimes a film having a stacked structure.

The overall thickness t1 of the membrane 120 may be set to, for example, not less than 50 nanometers (nm) and not more than 3 micrometers (μm). In this case, the overall thickness t1 may preferably be set to not less than 300 nm and not more than 1.5 μm.

Figure 19:
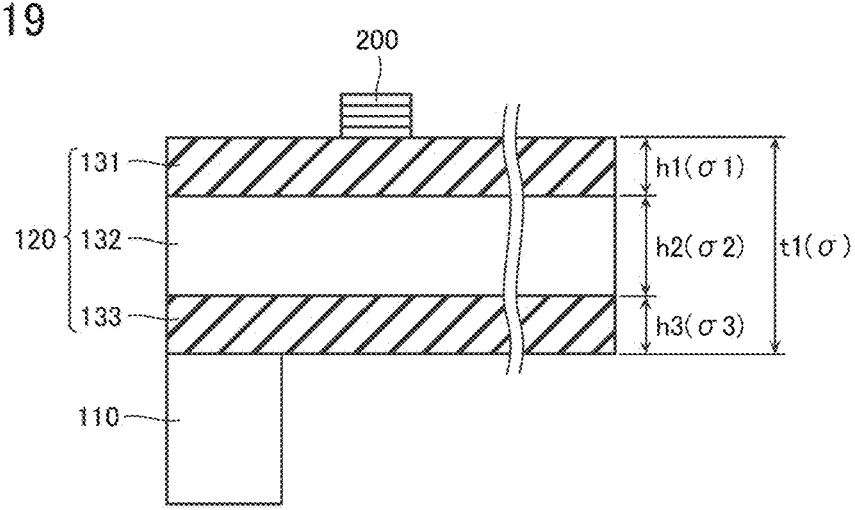
FIG. 19 is a schematic view showing film thicknesses h1, h2, and h3 of a first film 131, an intermediate film 132, and a second film 133 configuring a membrane 120, and residual stresses σ1, σ2, and σ3 of the first film 131, the intermediate film 132, and the second film 133.

FIG. 19 is a schematic view showing film thicknesses h1, h2, and h3 of the first film 131, the intermediate film 132, and the second film 133 configuring the membrane 120, and residual stresses σ1, σ2, and σ3 of the first film 131, the intermediate film 132, and the second film 133. For simplification of description, FIG. 19 shows a state after the hollow portion 111 has been formed, but the residual stresses σ1, σ2, and σ3 are residual stresses respectively occurring in the first film 131, the intermediate film 132, and the second film 133, before formation of the hollow portion 111. In order to apply a large strain to the strain detection element 200 with respect to a pressure from external and raise sensitivity of the pressure sensor 110A, it is desirable for a value of the residual stress σ of the membrane 120 to be close to 0 MPa. An average residual stress σave of the membrane 120 configured from the stacked structure is calculated by the formula below using the film thicknesses h1 to h3 and the residual stresses σ1 to σ3 of the first film 131, the intermediate film 132, and the second film 133.

$$\sigma ave=(h1*\sigma 1+h2*\sigma 2+h3*\sigma 3)/(h1+h2+h3)$$ Mathematical Expression 11

When the oxide that includes aluminum is deposited by sputtering to form the first film 131 and the second film 133, the residual stresses σ1 and σ3 of the first film 131 and the second film 133 can be controlled by adjusting a pressure of a sputter gas. At this time, the first film 131 and the second film 133 are deposited as amorphous aluminum oxide.

Note that the first film 131 undergoes etching due to milling for processing of the strain detection element 200 positioned above the first film 131, while the second film 133 undergoes etching due to a RIE method at a time of processing the hollow portion 111. If the film thickness h1 of the first film 131 and the film thickness h3 of the second film 133 have ended up changing due to the etching, then a value of the average residual stress σave of the membrane 120 as understood from the formula [Mathematical Expression 1] ends up changing.

However, the first film 131 and the second film 133 formed by the oxide that includes aluminum (Al) have a strong tolerance to milling and RIE, hence thickness of the films does not change before and after a manufacturing process. As a result, adopting a structure in which the intermediate film 132 is sandwiched by the first film 131 and the second film 133 as shown in FIG. 18 makes it possible for the value of the average residual stress σave of the membrane 120 to be easily controlled.

A reason why bending of the membrane 120 in the initial state can be suppressed by the above-described three-layer structure will be described below with reference to FIG. 20. In the description below referring to FIG. 20, values of the residual stress a are expressed as follows. That is, a residual stress a when a tensile residual stress occurs in the membrane 120 is expressed as a positive value, and conversely, a residual stress a when a compressive residual stress occurs in the membrane 120 is expressed as a negative value, with 0 MPa therebetween. Note that FIG. 20 shows the shape in the initial state of the membrane 120 when the pressure from external is not applied to the membrane 120.

In the case that there is a distribution of residual stress along the Z axis direction (a direction normal to the membrane 120) in the membrane 120 before processing/formation of the hollow portion 111, a moment acting in a direction causing the residual stress σ of the membrane 120 to increase is generated after processing/formation of the hollow portion 111.

Figure 20A:
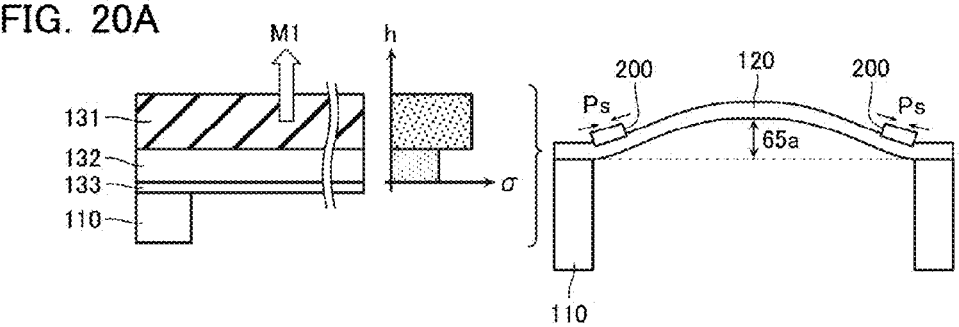
FIG. 20A, FIG. 20B, and FIG. 20C are schematic views explaining a reason why bending generated in the membrane 120 in a state where a pressure from external is not applied can be suppressed by the three-layer structured membrane 120 of the second embodiment.

First, as shown in FIG. 20A, consideration is given to the case where a difference in thickness of the film thickness h1 of the first film 131 and the film thickness h3 of the second film 133 is large, and a distribution causing the residual stress of the membrane 120 to increase occurs along the Z axis direction (a direction from the hollow portion 111 side toward the strain detection element 200 side). In this case, as shown in FIG. 20A, a moment M1 which is upwardly inclined in the Z direction is generated in the membrane 120.

FIG. 20A shows as an example the case of h1>>h3 and σ1>σ2. Moreover, it is also assumed that since h1>>h3, there is no contribution from the residual stress σ3.

Since the membrane 120 has the upwardly inclined moment M1, the membrane 120 has a convex shape with a large bending 65a in the initial state. As a result, a large compressive force Ps is applied to the strain detection element 200.

Figure 20B:
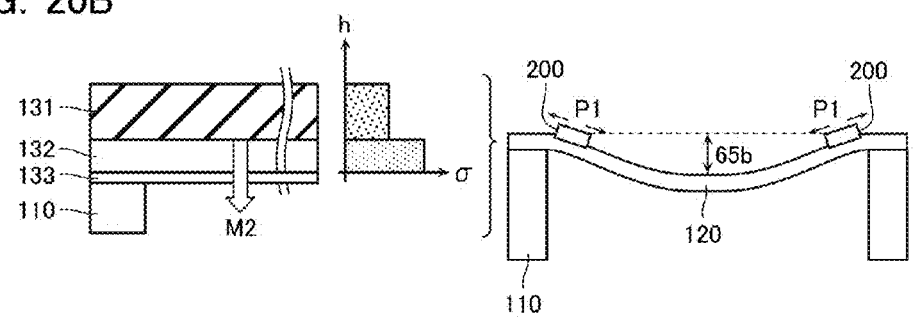

Next, as shown in FIG. 20B, consideration is given to the case where the difference in thickness of the film thickness h1 of the first film 131 and the film thickness h3 of the second film 133 is large, and a distribution causing the residual stress of the membrane 120 to decrease occurs along the Z axis direction (direction from the hollow portion 111 side toward the strain detection element 200 side). In this case, as shown in FIG. 208B, a moment M2 which is downwardly inclined in the Z direction is generated in the membrane 120. FIG. 20B shows as an example the case of h1>>h3 and σ1<σ2. Moreover, it is also assumed that since h1>>h3, there is no contribution from the residual stress σ3. Since the membrane 120 has the downwardly inclined moment M2, the membrane 120 has a concave shape with a large bending 65b in the initial state. As a result, a large tensile force P1 is applied to the strain detection element 200.

When large forces Ps and P1 are applied to the strain detection element 200 from the initial state, a change in magnetization of the magnetic layer due to the magnetostriction effect is not sufficiently caused and sensitivity of the pressure sensor 110A does not rise, even when the value of the residual stress σ of the membrane 120 is small and sensitivity of the membrane 120 to a pressure from external is good.

Figure 20C:
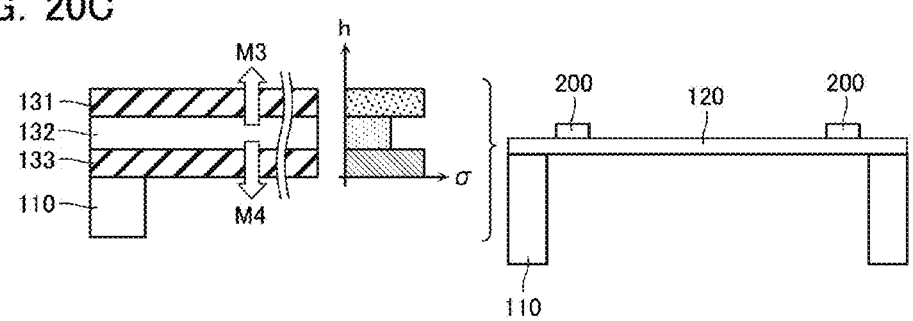

Next, referring to FIG. 20C, consideration is given to the case where the difference in thickness of the film thickness h1 of the first film 131 and the film thickness h3 of the second film 133 is small, the residual stress a increases as the hollow portion 111 side is approached from the intermediate film 132 of the membrane 120, and the residual stress c increases as the strain detection element 200 side is approached from the intermediate film 132 of the membrane 120. In this case, a moment M3 and a moment M4 respectively caused by the residual stress σ1 of the first film 131 and the residual stress σ2 of the intermediate film 132, and the residual stress σ3 of the second film 133 and the residual stress σ2 of the intermediate film 132, are generated in the membrane 120. FIG. 20C shows as an example the case of σ1>σ2 and σ3>σ2. When σ1<σ2 and σ3<σ2, respective inclinations of the moment M3 and the moment M4 are inversed. Since the moments M3 and M4 are generated in directions that cancel each other out, bending in the initial state of the membrane 120 is suppressed. Therefore, a force applied to the strain detection element 200 in the initial state is configured to be minute.

Note that some of the strain detection elements 200 may obtain highest sensitivity when a tensile or compressive force is not applied in the initial state where a pressure from external is not applied, and some other strain detection elements 200 may obtain highest sensitivity when a minute tensile or compressive force is applied. This depends on the thickness or material of the film configuring the strain detection element 200.

One method of applying a minute force to the strain detection element 200 in the initial state is to provide minute bending to the membrane 120 in the initial state. When the membrane 120 has a substantially symmetrical three-layer structure in the Z axis direction as in FIG. 18, magnitudes of each of the moments M3 and M4 can be finely adjusted by adjusting magnitudes of the film thicknesses h1, h2, and h3, whereby magnitude of bending in the initial state of the membrane 120 can be controlled with good precision.

The pressure sensor of the embodiment undergoes annealing for fixing of magnetization of the magnetic layer in a manufacturing process. In the case of different thermal expansion coefficients, thermal stresses are generated at an interface between the first film 131 and the intermediate film 132 or at an interface between the intermediate film 132 and the second film 133. Influence on the initial state of the membrane 120 due to moments generated from these thermal stresses can also be relieved by providing the membrane 120 with symmetry in the Z axis direction as in FIG. 13.

Figure 21A:
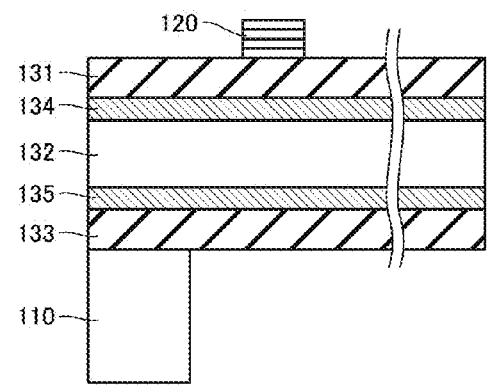
FIG. 21A shows a modified example of the second embodiment.

Moreover, as shown in FIG. 21A, at the interface between the first film 131 and the intermediate film 132 and at the interface between the intermediate film 132 and the second film 133, a third film 134 or a fourth film 135 may be newly formed at portions where composition has been modified by migration of an element configuring the membrane 120. Values of residual stress occurring in the third film 134 or the fourth film 135 may be different to those of the first film 131 or the second film 133. Influence on the initial state of the membrane 120 due to moments generated as a result of residual stresses of the third film 134 or the fourth film 135 can also be relieved by providing the membrane 120 with symmetry in the Z axis direction as in FIG. 18.

Advantages of Second Embodiment

As described above, in the pressure sensor 110A of the second embodiment, the upper surface and the lower surface of the membrane 120 are configured by an oxide that includes aluminum. Therefore, uniformity of film thickness of the membrane 120 can be secured and sensitivity of the pressure sensor 110A can be improved, similarly to the above-mentioned advantages of the first embodiment. That is, the second film 133 functions as a stopper film in etching for formation of the hollow portion 111, and the first film 131 functions as a stopper film in etching for sputtering of the strain detection element 200.

In addition, by adopting the above-mentioned three-layer structure in the membrane 120, the pressure sensor 110A of the second embodiment enables physical properties such as residual stress of the membrane 120 to be controlled, and enables bending of the membrane 120 in the initial state to be suppressed or adjusted, whereby sensitivity of the pressure sensor can be improved.

Moreover, it will be described with reference to FIGS. 21B to 21E how the membrane 120 configured from the first film 131, the intermediate film 132, and the second film 233 of the the second embodiment is effective for the pressure sensor 110A. The evaluation device and evaluation method shown in FIG. 16B are utilized in evaluation of the membrane 220.

Figure 21B:
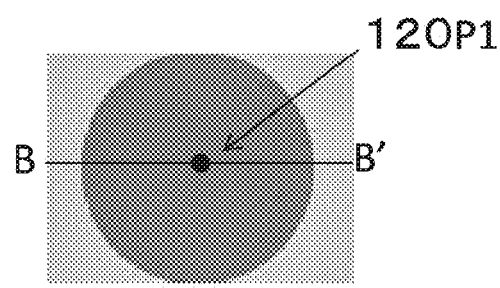
FIG. 21B is actual image data showing a measurement result by a laser microscope M3 in an initial state where an applied pressure from external is not applied, in the case that sputtering-deposited AlOx is employed as a material of the first film 131 and the second film 133 and a CVD (Chemical Vapor Deposition)-deposited SiNx film is employed as a material of the intermediate film 132.

FIG. 21B is actual image data showing a measurement result by the laser microscope M3 in the initial state where the applied pressure from external is not applied, in the case that sputtering-deposited AlOx is employed as the material of the first film 131 and the second film 133 and a CVD (Chemical Vapor Deposition)-deposited SiNx film is employed as the material of the intermediate film 132. Residual stress of the film before processing of the hollow portion 111 is adjusted to an appropriate value and a circle is adopted as the shape of the vibrating portion 121. Moreover, the diameter of the vibrating portion 121 is set to 530 μm, and the film thickness of the first film 131 is set to 100 nm, the film thickness of the second film 133 is set to 50 nm, and the film thickness of the intermediate film 132 is set to 550 nm. Moreover, FIG. 21B shows a membrane 120 not having the likes of the strain detection element 200 or electrodes connected to the strain detection element 200 disposed thereon. In FIG. 21B, the inside of the circular portion corresponds to the vibrating portion 121, and the outside of the circular portion corresponds to the supported portion 122.

Figure 21C:
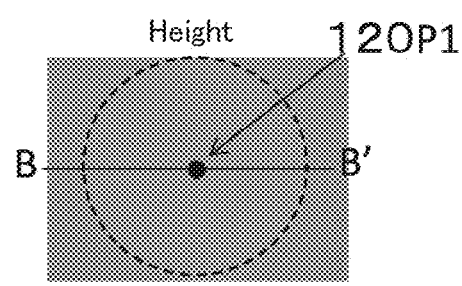
FIG. 21C is a view showing by color contrast a height distribution in a vertical direction (Z axis direction) of the membrane 120 shown in the image data of FIG. 21B.
Figure 21D:
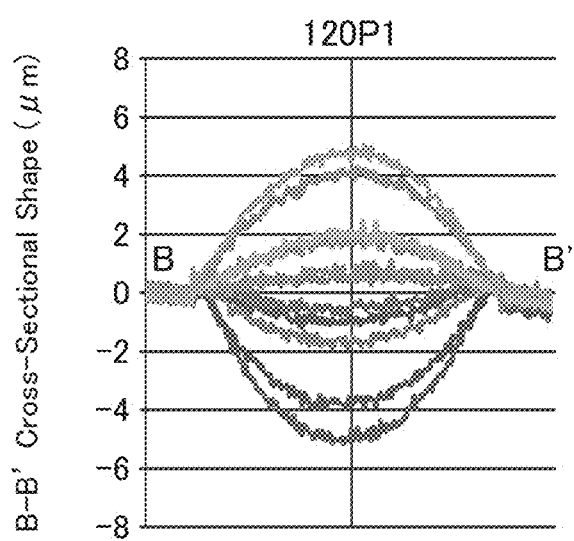
FIG. 21D shows a result of measuring a change in shape of the B-B' cross-section of FIG. 21B by the laser microscope M3, in the case that various applied voltages are applied to the membrane 120.
Figure 21E:
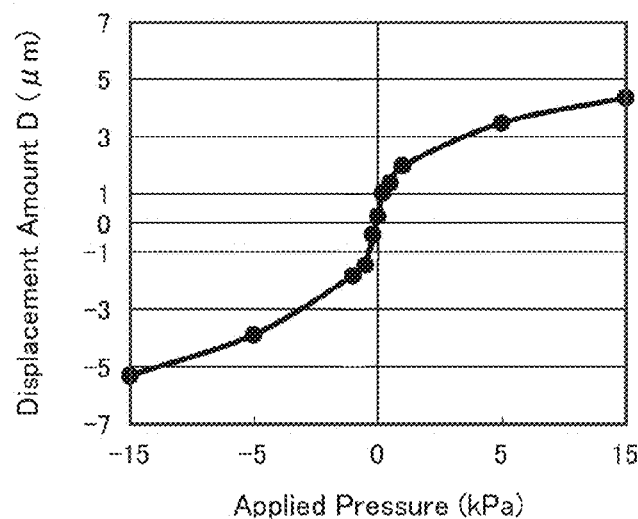
FIG. 21E is a graph assuming the horizontal axis to be the applied pressure 80 and the vertical axis to be a displacement amount D of a centroid 120P1 of the membrane 120, in the case of FIG. 21D.

FIG. 21C is a view showing by color contrast a height distribution in a vertical direction (Z axis direction) of the membrane 120 shown in the image data of FIG. 21E. It is found from the fact that color of FIG. 21C is uniform, that the membrane 120 is flat in the initial state. As previously mentioned, sometimes, when a large bending occurs in the membrane 120 in the initial state, the strain detection element 200 cannot sufficiently display its performance.

FIG. 21D shows a result of measuring a change in shape in the B-B' cross-section of FIG. 21B by the laser microscope M3, in the case that applied voltages of −10 kPa, −5 kPa, −1 kPa, −0.5 kPa, −0.2 kPa, 0 kPa, 0.2 kPa, 0.5 kPa, 1 kPa, 5 kPa, and 10 kPa are applied to the membrane 120. It is found that shapes of the film to left and right bounded by the centroid 120P1 of the membrane 120 are equal, and forces applied to the strain detection element 200 disposed at the edge of the vibrating portion 121 when the vibrating portion 121 is deformed are equal.

FIG. 21E is a graph assuming the horizontal axis to be the applied pressure 80 and the vertical axis to be the displacement amount D of the centroid 120P1 of the membrane 120, in the case of FIG. 21O. It is found from this graph that the displacement amount D of the centroid 120P1 of the vibrating portion 121 shows a steep change in a small range of the applied pressure 80 from external. In other words, the membrane 120 responds to a change in applied pressure with good sensitivity. The membrane 120 shown in FIG. 21B has a displacement inclination of 3.6 μm/kPa in a range of applied pressure of −0.2 kPa to 0.2 kPa.

It is found from the measurement results shown in FIGS. 21D and 21E that in the case of employing a membrane 120 in which sputtering-deposited AlOx is utilized as the material of the first film 131 and the second film 133 and a CVD-deposited SiNx film is employed as the material of the intermediate film 132, it becomes possible to produce a pressure sensor 110A having a membrane in which bending in the initial state is small, moreover in which the shape of the film when bending has occurred is symmetrical, and which responds with good sensitivity to an applied pressure.

Third Embodiment

Figure 22:
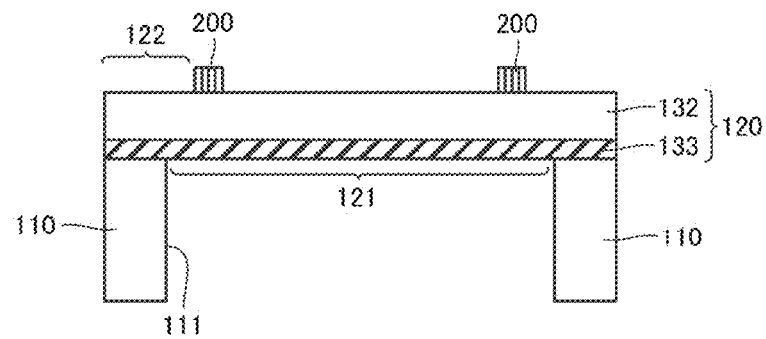
FIG. 22 is a cross-sectional view taken along the line A-A' of FIG. 1, in a pressure sensor of a third embodiment.

Next, a pressure sensor according to a third embodiment will be described with reference to FIG. 22. The pressure sensor of this third embodiment has a configuration of the membrane 120 which differs from that of the first embodiment. Other configurations are similar to those of the first embodiment. In FIG. 22, configurations identical to those of the first embodiment are assigned with reference symbols identical to those assigned in the first embodiment, and detailed descriptions thereof will be omitted below.

FIG. 22 is a schematic cross-sectional view of the A-A' cross-section of FIG. 1. As shown in FIG. 22, the membrane 120 is formed by a two-layer structure of a film 133 disposed on the substrate 110 side, and a film 132 disposed upwardly of the film 133. The film 133 is configured by an oxide that includes aluminum similarly to the film 133 of the second embodiment, and the film 132 is configured from a material identical to that of the intermediate film 132 of the second embodiment. That is, the membrane 120 of this third embodiment adopts a configuration in which the first film 131 is removed from the membrane 120 of the second embodiment. In other words, in the membrane 120 of the third embodiment, only a first surface on a side of the substrate 110 acting as a support member; is configured from the oxide that includes aluminum. Expressing this in yet another way, the membrane 120 of the third embodiment includes: the first film including the oxide that includes aluminum; and the third film, and the third film is positioned between the first film and the strain detection element. Note that a film thickness of the film 133 may be set to not less than 10 μm and not more than 300 μm, and more preferably to not less than 20 nm and not more than 200 nm.

Advantages of Third Embodiment

As described above, in the pressure sensor 110A of the third embodiment, a lower surface (the film 133) of the membrane 120 is configured by an oxide that includes aluminum. There is no film of an oxide that includes aluminum on an upper surface of the membrane 120, hence flatness at the upper surface of the membrane 120 is somewhat lost, but at the lower surface of the membrane 120, the film 133 can be caused to function as a stopper film in etching for formation of the hollow portion 111. Therefore, uniformity of film thickness of the membrane 120 can be secured and advantages similar to those of the first embodiment can be obtained.

Fourth Embodiment

Figure 23:
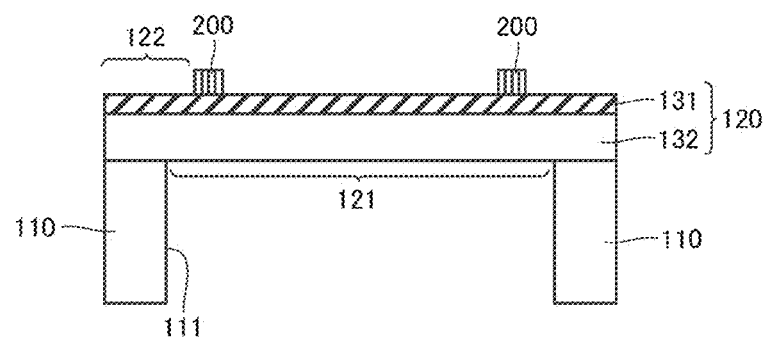
FIG. 23 is a cross-sectional view taken along the line A-A' of FIG. 1, in a pressure sensor of a fourth embodiment.

Next, a pressure sensor according to a fourth embodiment will be described with reference to FIG. 23. The pressure sensor of this fourth embodiment has a configuration of the membrane 120 which differs from that of the previously mentioned embodiments. Other configurations are similar to those of the previously mentioned embodiments. In FIG. 23, configurations identical to those of the previously mentioned embodiments are assigned with reference symbols identical to those assigned in the previously mentioned embodiments, and detailed descriptions thereof will be omitted below.

FIG. 23 is a schematic cross-sectional view of the A-A' cross-section of FIG. 1. As shown in FIG. 23, the membrane 220 is formed by a two-layer structure of a film 131 on which the strain detection element 200 is disposed, and a film 132 disposed downwardly of the film 131. The film 131 is configured by an oxide that includes aluminum similarly to the film 131 of the second embodiment, and the film 132 is configured from a material identical to that of the intermediate film 132 of the second embodiment. That is, the membrane 120 of this fourth embodiment adopts a configuration in which the second film 133 is removed from the membrane 120 of the second embodiment. In other words, in the membrane 120 of the fourth embodiment, only a second surface on a side of the strain detection element 200 is configured from the oxide that includes aluminum. Expressing this in yet another way, the membrane 120 of the fourth embodiment includes: the second film including the oxide that includes aluminum; and the third film, and the second film is positioned between the third film and the strain detection element. Note that a film thickness of the film 131 may be set to not less than 10 μm and not more than 300 μm, and more preferably to not less than 20 nm and not more than 200 nm.

Advantages of Fourth Embodiment

As described above, in the pressure sensor 110A of the fourth embodiment, an upper surface (the film 131) of the membrane 120 is configured by an oxide that includes aluminum. There is no film of an oxide that includes aluminum on a lower surface of the membrane 120, hence flatness at the lower surface of the membrane 120 is somewhat lost, but at the upper surface of the membrane 120, the film 131 can be caused to function as a stopper film in etching for formation of the strain detection element 200. Therefore, uniformity of film thickness of the membrane 120 can be secured and advantages similar to those of the first embodiment can be obtained.

Figure 24A:
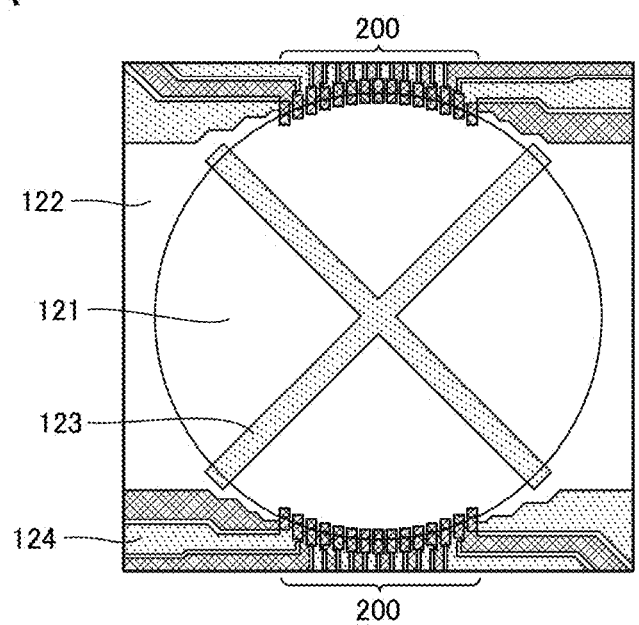
FIG. 24A shows an example of design of the pressure sensor 110A according to the first through fourth embodiments.

FIG. 24A shows an example of design of the pressure sensor 10A according to the first through fourth embodiments.

FIG. 24A is an example of the case where a circle is adopted as the shape of the vibrating portion 121, and the diameter of the vibrating portion 121 is designed to be 530 μm. A length of one side of the strain detection element 200 is 10 μm, and a total of 20 or more, in the illustrated example a total of 30, of the strain detection elements 200 are disposed, divided into two places, on one vibrating portion 121. An electrode 124 connected to the strain detection element 200 is routed so as to pass as much as possible over the supported portion 122 in order not to hinder movement of the vibrating portion 121. A shape of a beam 123 on the vibrating portion 121 can be changed to match a method of placement of the strain detection elements 200, and the beam 123 is sometimes also removed.

Figure 24B:
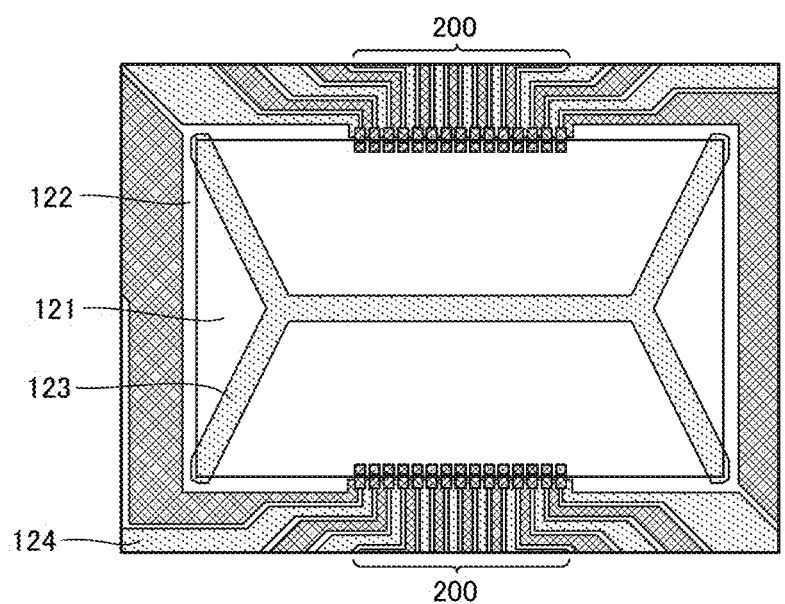
FIG. 24B shows another example of design of the pressure sensor 110A according to the first through fourth embodiments.

FIG. 24B is an example of the case where a rectangle is adopted as the shape of the vibrating portion 121, and a length of a long side of the vibrating portion 121 is designed to be 578 μm and a length of a short side of the vibrating portion 121 is designed to be 376 μm. A length of one side of the strain detection element 200 is 10 μm, and a total of 30 of the strain detection elements 200 are disposed in parallel close to the two long sides on the vibrating portion 121. An electrode 124 connected to the strain detection element 200 is routed so as to pass as much as possible over the supported portion 122 in order not to hinder movement of the vibrating portion 121. A shape of a beam 123 on the vibrating portion 121 can be changed to match a method of placement of the strain detection elements 200, and the beam 123 is sometimes also removed.

Note that in FIGS. 24A and 24B, the beam 323 is provided on the membrane 120 that bends due to pressure, but these beams 123 need not be present. The beam 120 is formed on the membrane 120 by a material different from that of the membrane 120.

Figure 24C:
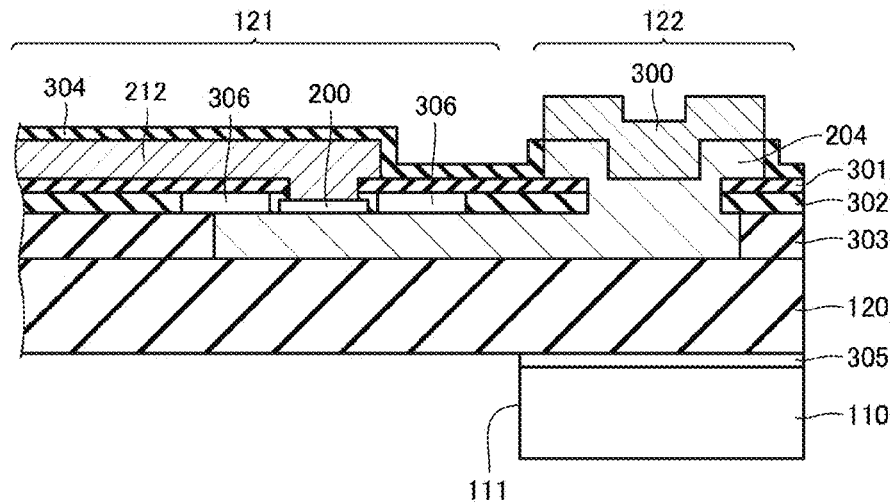
FIG. 24C is a schematic view of a cross-sectional structure of the pressure sensor 110A in the case where the membrane 120 of the kind shown in the first embodiment is used.

FIG. 24C is a schematic view of a cross-sectional structure of the pressure sensor 110A in the case where a single film formed by an oxide that includes aluminum of the kind shown in the first embodiment is used in the membrane 120. The lower electrode 204 and the upper electrode 212 are disposed such that a current in the Z axis direction (direction perpendicular to the membrane 120) flows in the strain detection element 200. Parts of the lower electrode 204 and the upper electrode 212 are present on the vibrating portion 121. Therefore, a material capable of lowering of residual stress is employed in the lower electrode 204 and the upper electrode 212, so as not to hinder movement of the vibrating portion 121.

On the other hand, on the supported portion 122, a gold pad 300 is attached to the lower electrode 204 and the upper electrode 212. In order to prevent leak of current, a periphery of the lower electrode 204, the upper electrode 212, and the strain detection element 200 is protected by a lower electrode-embedding insulating film 303, a strain detection element-embedding insulating film 302, an insulating film 301 surrounding other than a portion contacting the strain detection element 200 of the upper electrode 212, and an insulating film 304. In the case that the oxide that includes aluminum forming the membrane 120 shows insulating properties, a material similar to that of the membrane 120 can be used in the insulating films 301, 302, 303, and 304. In other words, the insulating films 301, 302, 303, and 304 are also capable of lowering of residual stress. Moreover, it also becomes possible to avoid a problem such as film peeling generated by a difference in materials at an interface of the membrane 120 and the lower electrode-embedding insulating film 303.

Moreover, in order to increase adhesion of the substrate 110 and the membrane 120, an adhesion film 305 is sometimes provided between the membrane 120 and the substrate 110. The adhesion film 305 is a thin film, hence is shaved off during hollow portion 111 processing in a region of the vibrating portion 121. Therefore, the adhesion film 305 never exerts an influence on mechanical characteristics of the vibrating portion 121. A magnetic body 306 is sometimes disposed in a periphery of the strain detection element 200. A hard magnetic body of the likes of CoPt, CoCrPt, and FePt is employed as the magnetic body 306, as a bias layer for applying to the strain detection element. As a result, stable characteristics as a strain detection element are shown, and it also becomes possible to reduce noise. A preferable embodiment is to set the initial magnetization direction of the strain detection element to be at substantially 45 degrees to a direction of application of stress. Considering also the likes of angular misalignment, and so on, setting to be 30 to 60 degrees represents a realistic example of design.

Figure 24D:
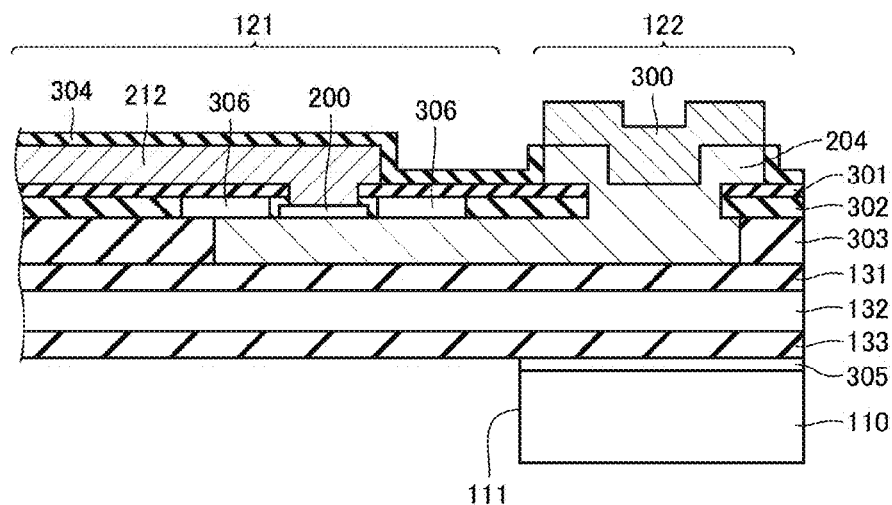
FIG. 24D is a schematic view of a cross-sectional structure of the pressure sensor 110A in the case where the membrane 120 of the kind shown in the second embodiment is used.

FIG. 24D is a schematic view of a cross-sectional structure of the pressure sensor 110A in the case of adopting a configuration of the membrane 120 of the kind shown in the second embodiment. The lower electrode 204 and the upper electrode 212 are disposed such that a current in the Z axis direction (direction perpendicular to the membrane 120) flows in the strain detection element 200. Parts of the lower electrode 204 and the upper electrode 212 are present on the vibrating portion 121. Therefore, a material capable of lowering of residual stress is employed in the lower electrode 204 and the upper electrode 212, so as not to hinder movement of the vibrating portion 121. In order to prevent leak of current, a periphery of the lower electrode 204, the upper electrode 212, and the strain detection element 200 is protected by a lower electrode-embedding insulating film 303, a strain detection element-embedding insulating film 302, an insulating film 301 surrounding other than a portion contacting the strain detection element 200 of the upper electrode 212, and an insulating film 304.

In the case that the oxide that includes aluminum forming the first film 131 shows insulating properties, a material similar to that of the first film 131 can be used in the insulating films 301, 302, 303, and 304. As a result, it also becomes possible to avoid a problem such as film peeling generated by a difference in materials at an interface of the first film 131 and the lower electrode-embedding insulating film 303. In order to increase adhesion of the substrate 110 and the membrane 120, an adhesion film 305 is sometimes provided between the membrane 120 and the substrate 110. The adhesion film 305 is a thin film, hence is shaved off during hollow portion 111 processing in a region of the vibrating portion 121. Therefore, the adhesion film 305 never exerts an influence on mechanical characteristics of the vibrating portion 121. A magnetic body 306 is sometimes disposed in a periphery of the strain detection element 200. A hard magnetic body of the likes of CoPt, CoCrPt, and FePt is employed as the magnetic body 306, as a bias layer for applying to the strain detection element. As a result, stable characteristics as a strain detection element are shown, and it also becomes possible to reduce noise. A preferable embodiment is to set the initial magnetization direction of the strain detection element to be at substantially 45 degrees to a direction of application of stress. Considering also the likes of angular misalignment, and so on, setting to be 30 to 60 degrees represents a realistic example of design. An additional element may be added to the above-described hard magnetic body.

Fifth Embodiment

Figure 25:
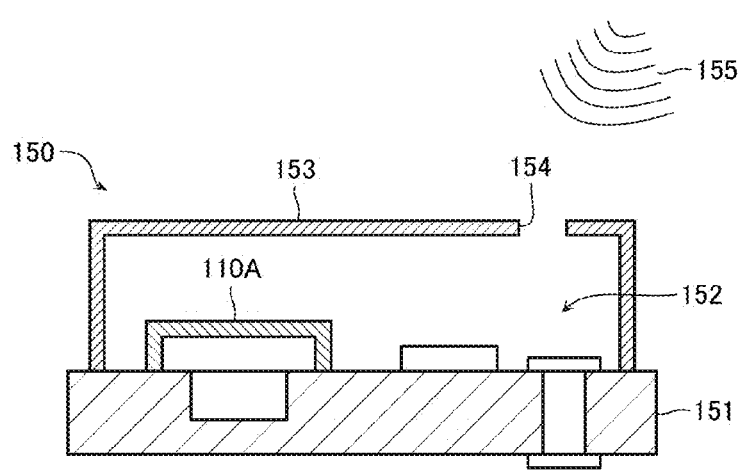
FIG. 25 is a schematic cross-sectional view showing a configuration of a microphone according to a fifth embodiment.

Next, a fifth embodiment will be described with reference to FIG. 25. FIG. 25 is a schematic cross-sectional view showing a configuration of a microphone 150 according to the present embodiment. The pressure sensor 110A installed with the strain detection element 200 according to the first through fourth embodiments can be installed in a microphone, for example.

The microphone 150 according to the present embodiment includes: a printed board 151 installed with the pressure sensor 110A; an electronic circuit 152 installed on the printed board 151; and a cover 153 covering the pressure sensor 110A and the electronic circuit 152 along with the printed board 151. The pressure sensor 110A is a pressure sensor installed with the strain detection element 200 according to the first through fourth embodiments.

The cover 153 is provided with an acoustic hole 154 from which a sound wave 155 enters. When the sound wave 155 enters inside the cover 153, the sound wave 155 is detected by the pressure sensor 110A. The electronic circuit 152 passes a current through the strain detection element installed in the pressure sensor 110A and detects a change in resistance value of the pressure sensor 110A, for example. Moreover, the electronic circuit 152 may amplify this current value by an amplifier circuit, and so on.

The pressure sensor installed with the strain detection element 200 according to the first through fourth embodiments has high sensitivity, hence the microphone 150 installed therewith can perform detection of the sound wave 155 with good sensitivity.

Sixth Embodiment

Figure 26:
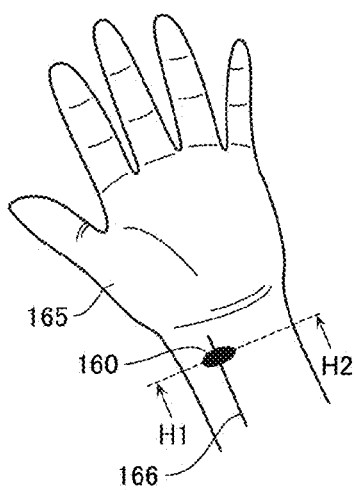
FIG. 26 is a schematic view showing a configuration of a blood pressure sensor according to a sixth embodiment.
Figure 27:
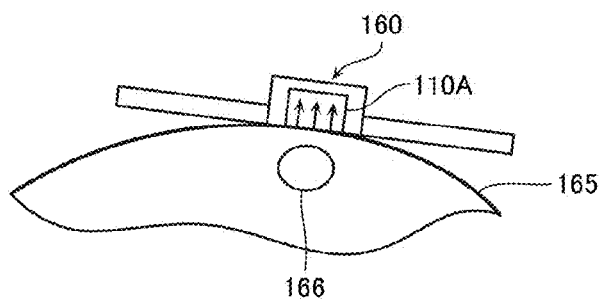
FIG. 27 is a schematic cross-sectional view of the same blood pressure sensor as seen from H1-H2.

Next, a sixth embodiment will be described with reference to FIGS. 26 and 27. FIG. 26 is a schematic view showing a configuration of a blood pressure sensor 160 according to the sixth embodiment. FIG. 27 is a schematic cross-sectional view of the blood pressure sensor 160 as seen from H1-H2. The pressure sensor 110A installed with the strain detection element 200 according to the first through fourth embodiments can be installed in the blood pressure sensor 160, for example.

As shown in FIG. 26, the blood pressure sensor 160 is affixed over an artery 166 of an arm 165 of a human, for example. Moreover, as shown in FIG. 27, the blood pressure sensor 160 is installed with the pressure sensor 110A installed with the strain detection element 200 according to the first through fourth embodiments, whereby blood pressure can be measured.

The pressure sensor 110A installed with the strain detection element 200 according to the first through fourth embodiments has high sensitivity, hence the blood pressure sensor 160 installed therewith can perform detection of blood pressure continuously with good sensitivity.

Seventh Embodiment

Figure 28:
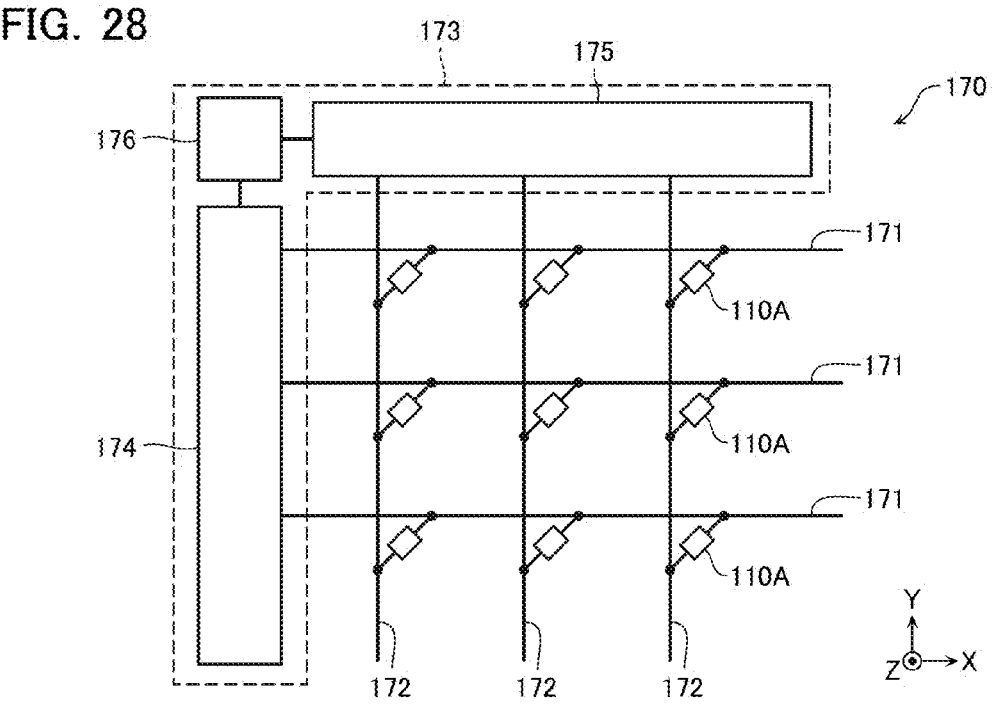
FIG. 28 is a schematic circuit diagram showing a configuration of a touch panel according to a seventh embodiment.

Next, a seventh embodiment will be described with reference to FIG. 28. FIG. 28 is a schematic circuit diagram showing a configuration of a touch panel 170 according to the seventh embodiment. The touch panel 170 is installed in at least one of an inside or an outside of a display not illustrated.

The touch panel 170 includes: a plurality of pressure sensors 110A disposed in a matrix; a plurality of first wiring lines 171 disposed in plurality in a Y direction and respectively connected to one ends of a plurality of the pressure sensors 110A disposed in an X direction; a plurality of second wiring lines 172 disposed in plurality in the X direction and respectively connected to the other ends of a plurality of the pressure sensors 110A disposed in the Y direction; and a control unit 173 that controls the plurality of first wiring lines 171 and the plurality of second wiring lines 172. The pressure sensor 110A is the pressure sensor according to the first through fourth embodiments.

Moreover, the control unit 173 includes: a first control circuit 174 that controls the first wiring line 171; a second control circuit 175 that controls the second wiring line 172; and a third control circuit 176 that controls the first control circuit 174 and the second control circuit 175.

For example, the control unit 173 passes a current through the pressure sensor 110A via the plurality of first wiring lines 171 and the plurality of second wiring lines 172. Now, when a touch surface not illustrated is pressed, the pressure sensor 110A has a resistance value of its strain detection element changed according to that pressure. The control unit 173 specifies a position of the pressure sensor 110A where a pressure due to pressing was detected, by detecting this change in resistance value.

The pressure sensor 110A installed with the strain detection element 200 according to the first through fourth embodiments has high sensitivity, hence the touch panel 170 installed therewith can perform detection of pressure due to pressing with good sensitivity. Moreover, the pressure sensor 110A is miniature, and a high resolution touch panel 170 can be manufactured.

Note that the touch panel 170 may include a detection element for detecting touch, other than the pressure sensor 110A.

Other Application Examples

Application examples of the pressure sensor 110A installed with the strain detection element 200 according to the first through fourth embodiments were described above with reference to specific examples. However, the pressure sensor 110A can be applied to a variety of pressure sensor devices, such as an atmospheric pressure sensor or tire air pressure sensor, and so on, in addition to the fifth through seventh embodiments shown.

Moreover, regarding specific configurations of each element such as the membrane, the strain detection element, the first magnetic layer, the second magnetic layer, and the intermediate layer included in the strain detection element 200, the pressure sensor 110A, the microphone 150, the blood pressure sensor 160, and the touch panel 170, such specific configurations are included in the scope of the present invention provided they can be similarly implemented by a person skilled in the art by appropriately selecting from a publicly-known scope and provided that they allow similar advantages to be obtained.

Moreover, combinations in a technically possible range of two or more elements of each of the specific examples are also included in the scope of the present invention provided that they fall within the spirit of the present invention.

In addition, all strain detection elements, pressure sensors 110A, microphones 150, blood pressure sensors 160, and touch panels 170 capable of being implemented by appropriate design change by a person skilled in the art based on the strain detection element, pressure sensor 110A, microphone 150, blood pressure sensor 160, and touch panel 170 mentioned above as embodiments of the present invention also belong to the scope of the present invention provided that they fall within the spirit of the present invention.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:
1. A pressure sensor, comprising:
a support member including silicon;
a membrane supported by the support member, the membrane being flexible, the membrane including a first portion and a second portion, the first portion overlapping the support member in a first direction, the second portion not overlapping the support member in the first direction, the second portion including a central part and an edge part located around the central part, a first thickness of the central part along the first direction being thinner than a second thickness of the edge part in the first direction; and
a strain detection element provided on the membrane at the edge part, the strain detection element including
a first magnetic layer,
a second magnetic layer apart from the first magnetic layer in the first direction, and
an intermediate layer provided between the first magnetic layer and the second magnetic layer,
an electrical resistance of the strain detection element being configured to change depending on a strain of the membrane, wherein the strain detection element operates based on the magnetoresistive effect.

2. The pressure sensor according to claim 1, wherein
- a line segment extending along an extending direction and joining a centroid of the membrane and the strain detection element passes a point of a boundary between the first portion and the second portion, and
- a position of the strain detection element along the extending direction is located between a position of a central point of the line segment along the extending direction and a position of the boundary along the extending direction.

3. The pressure sensor according to claim 1, wherein 20 or more strain detection elements are disposed on the membrane.

4. The pressure sensor according to of claim 1, wherein the membrane has a rectangular shape.

5. The pressure sensor according to claim 1, wherein a minimum circumscribed rectangle that circumscribes a shape of the membrane includes:
- a first side;
- a second side separated from the first side;
- a third side connected to one end of the first side and one end of the second side;
- a fourth side connected to the other end of the first side and the other end of the second side; and
- a centroid of the minimum circumscribed rectangle,
- the strain detection element is provided in a plurality,
- the strain detection elements are disposed on the membrane, and aligned in parallel to the first side, and
- the strain detection elements are disposed on an area on the membrane that overlaps a region configured from the first side and line segments joining both ends of the first side and the centroid of the minimum circumscribed rectangle.

6. The pressure sensor according to claim 1, wherein a hard magnetic body is further adjacent to a periphery of the strain detection element disposed on the membrane.

7. The pressure sensor according to claim 6, wherein the hard magnetic body includes at least one of CoPt or FePt.

8. The pressure sensor according to claim 1, wherein the strain detection element is buried by a layer of an oxide including aluminum showing insulation properties.

9. The pressure sensor according to claim 1, wherein the membrane includes a first film including a first oxide including aluminum.

10. The pressure sensor according to claim 9, wherein the membrane further includes:
- a second film apart from the first film in the first direction, the second film including a second oxide including aluminum; and
- a third film provided between the first film and the second film.

11. The pressure sensor according to claim 10, wherein the third film includes SiNx.

12. The pressure sensor according to claim 10, wherein a part of the first film is located between a part of the second film and the support member in the first direction.

13. The pressure sensor according to claim 9, wherein the first film is amorphous.

14. The pressure sensor according to claim 13, wherein a ratio of the first thickness to the second thickness not less than 0.95.

15. The pressure sensor according to claim 9, wherein the first film includes a portion overlapping the support member in the first direction, and a portion not overlapping the support member in the first direction.

16. The pressure sensor according to claim 9, wherein the first film directly contacts the support member.

17. The pressure sensor according to claim 9, wherein
- the membrane further includes an other film,
- a part of the first film is located between a part of the other film and the support member.

18. The pressure sensor according to claim 1, wherein a ratio of the first thickness to the second thickness not less than 0.90.

19. The pressure sensor according to claim 1, wherein a ratio of the first thickness to the second thickness not less than 0.95.

* * * * *